(12) United States Patent
Resch et al.

(10) Patent No.: US 10,289,688 B2
(45) Date of Patent: *May 14, 2019

(54) METADATA ACCESS IN A DISPERSED STORAGE NETWORK

(75) Inventors: Jason K. Resch, Chicago, IL (US); Greg Dhuse, Chicago, IL (US); Andrew Baptist, Chicago, IL (US); Wesley Leggette, Oak Park, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 409 days.

This patent is subject to a terminal disclaimer.

(21) Appl. No.: 13/154,725

(22) Filed: Jun. 7, 2011

(65) Prior Publication Data

US 2011/0314072 A1   Dec. 22, 2011

Related U.S. Application Data

(60) Provisional application No. 61/357,430, filed on Jun. 22, 2010.

(51) Int. Cl.
*G06F 17/00*   (2006.01)
*G06F 17/30*   (2006.01)
(Continued)

(52) U.S. Cl.
CPC .... *G06F 17/30091* (2013.01); *G06F 11/0727* (2013.01); *G06F 11/141* (2013.01);
(Continued)

(58) Field of Classification Search
USPC ............... 707/812, 807, 999.102, 999.101
See application file for complete search history.

(56) References Cited

U.S. PATENT DOCUMENTS 4,092,732 A   5/1978 Ouchi
5,454,101 A   9/1995 Mackay et al.
(Continued)

OTHER PUBLICATIONS

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

(Continued)

*Primary Examiner* — Eliyah S. Harper
(74) *Attorney, Agent, or Firm* — Garlick & Markison; Timothy W. Markison; Bruce E. Stuckman

(57) ABSTRACT

A method begins by a processing module dispersed storage error encoding a data segment to produce a set of encoded data slices and dispersed storage error encoding metadata associated with the data segment to produce a set of encoded metadata slices. The method continues with the processing module creating a set of data slice names for the set of encoded data slices and creating a set of metadata slice names based on the set of data slice names. The method continues with the processing module sending the set of encoded data slices and the set of data slice names to a dispersed storage network (DSN) memory for storage therein. The method continues with the processing module sending the set of encoded metadata slices and the set of metadata slice names to the DSN memory for storage therein.

16 Claims, 25 Drawing Sheets

(51) Int. Cl.
*H04L 29/06* (2006.01)
*H04W 12/04* (2009.01)
*H04L 9/32* (2006.01)
*G06F 11/07* (2006.01)
*G06F 11/14* (2006.01)
*G06F 21/62* (2013.01)

(52) U.S. Cl.
CPC .......... *H04L 9/3242* (2013.01); *H04L 9/3247* (2013.01); *H04L 9/3263* (2013.01); *H04L 9/3271* (2013.01); *H04L 63/06* (2013.01); *H04L 63/12* (2013.01); *H04W 12/04* (2013.01); *G06F 17/30097* (2013.01); *G06F 21/6209* (2013.01); *H04L 63/0428* (2013.01); *H04L 2209/043* (2013.01); *H04L 2209/30* (2013.01); *H04L 2209/34* (2013.01); *H04L 2209/56* (2013.01); *H04L 2209/80* (2013.01)

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 5/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 2002/0062422 A1 | 5/2002 | Butterworth et al. |
| 2002/0166079 A1* | 11/2002 | Ulrich .................. G06F 9/5083 714/6.12 |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2003/0135495 A1* | 7/2003 | Vagnozzi .......... G06F 17/30324 |
| 2004/0024963 A1 | 2/2004 | Talagala et al. |
| 2004/0093378 A1* | 5/2004 | Warnock .................. 709/203 |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0099498 A1* | 5/2005 | Lao .................. H04N 5/765 348/207.99 |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0136448 A1 | 6/2006 | Cialini et al. |
| 2006/0155792 A1* | 7/2006 | Inoue .................. G06F 12/023 |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0283167 A1 | 6/2007 | Venters, III et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2010/0268692 A1* | 10/2010 | Resch .................. G06F 11/1044 707/687 |
| 2011/0055277 A1* | 3/2011 | Resch .................. G06F 11/1004 707/785 |
| 2011/0055903 A1* | 3/2011 | Leggette ............. G06F 11/1004 726/4 |
| 2011/0106909 A1* | 5/2011 | Gladwin ............. G06F 11/1004 709/217 |
| 2011/0225466 A1* | 9/2011 | Resch .................. G06F 12/0646 714/54 |

OTHER PUBLICATIONS

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

(56) References Cited

OTHER PUBLICATIONS

Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.

\* cited by examiner

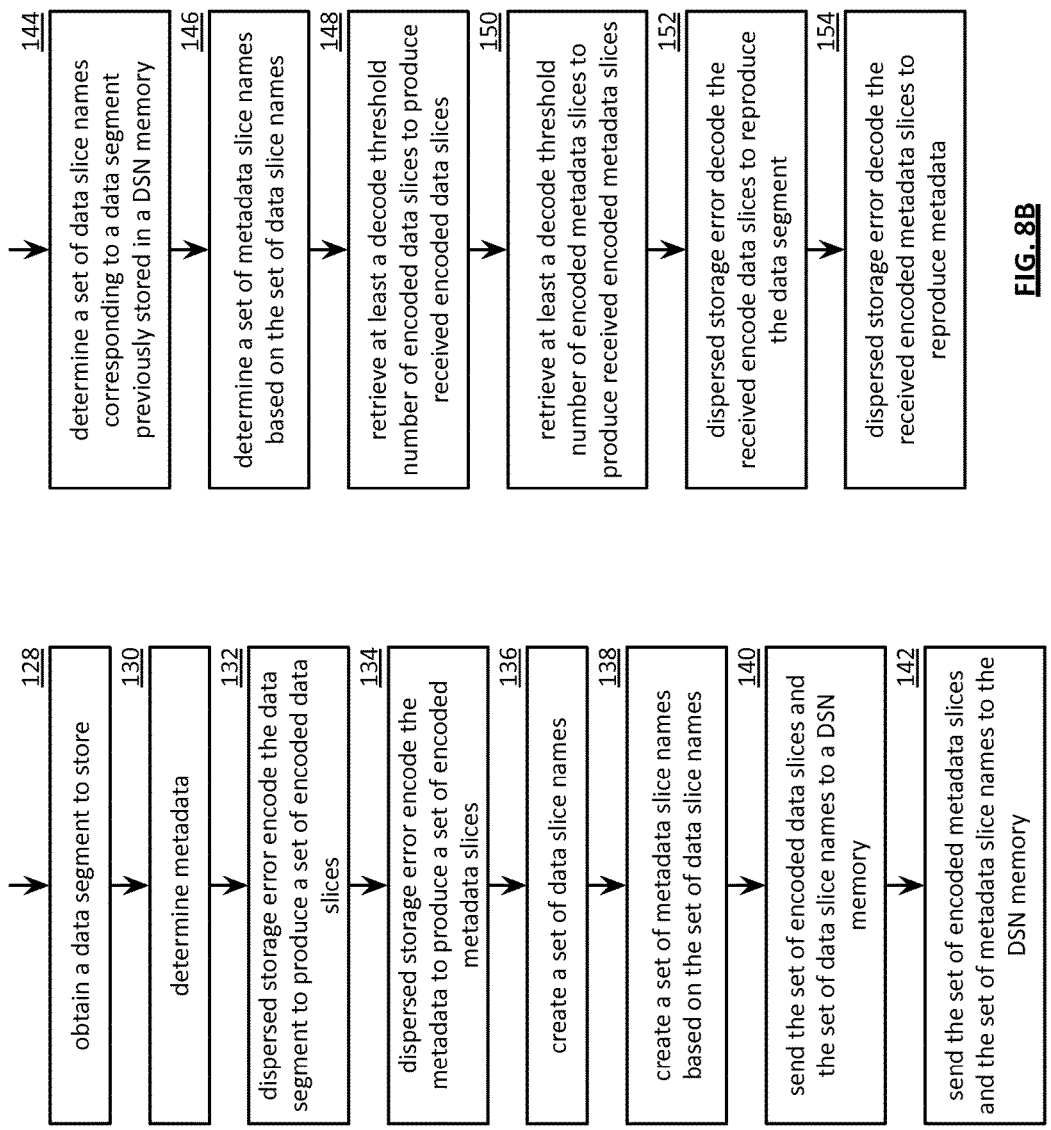

| slice 1 | slice 2 | slice 3 | slice 4 | slice 5 | slice 6 | slice 7 | slice 8 |
|---|---|---|---|---|---|---|---|
| data segment 158 | | | | | parity 160 | | | data segment 158 | data segment 158 | data segment 158 | data segment 158 data 156

FIG. 9A

| slice 1 | slice 2 | slice 3 | slice 4 | slice 5 | slice 6 | slice 7 | slice 8 |
|---|---|---|---|---|---|---|---|
| data segment 162 | | | | | parity 164 | | | segment 162
segment 162
segment 162
segment 162
segment 162
segment 162
segment 162 data 156

FIG. 9B

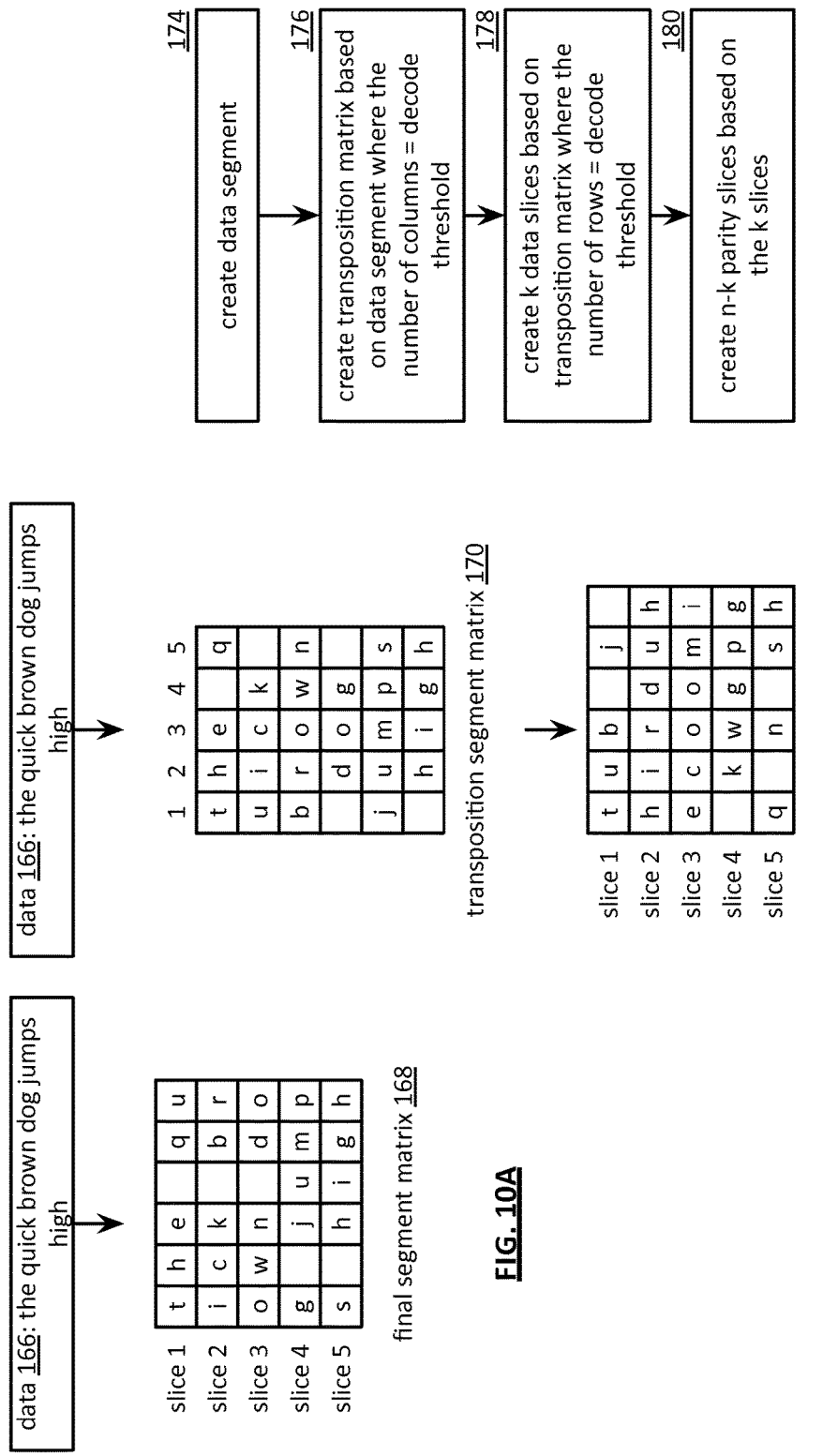

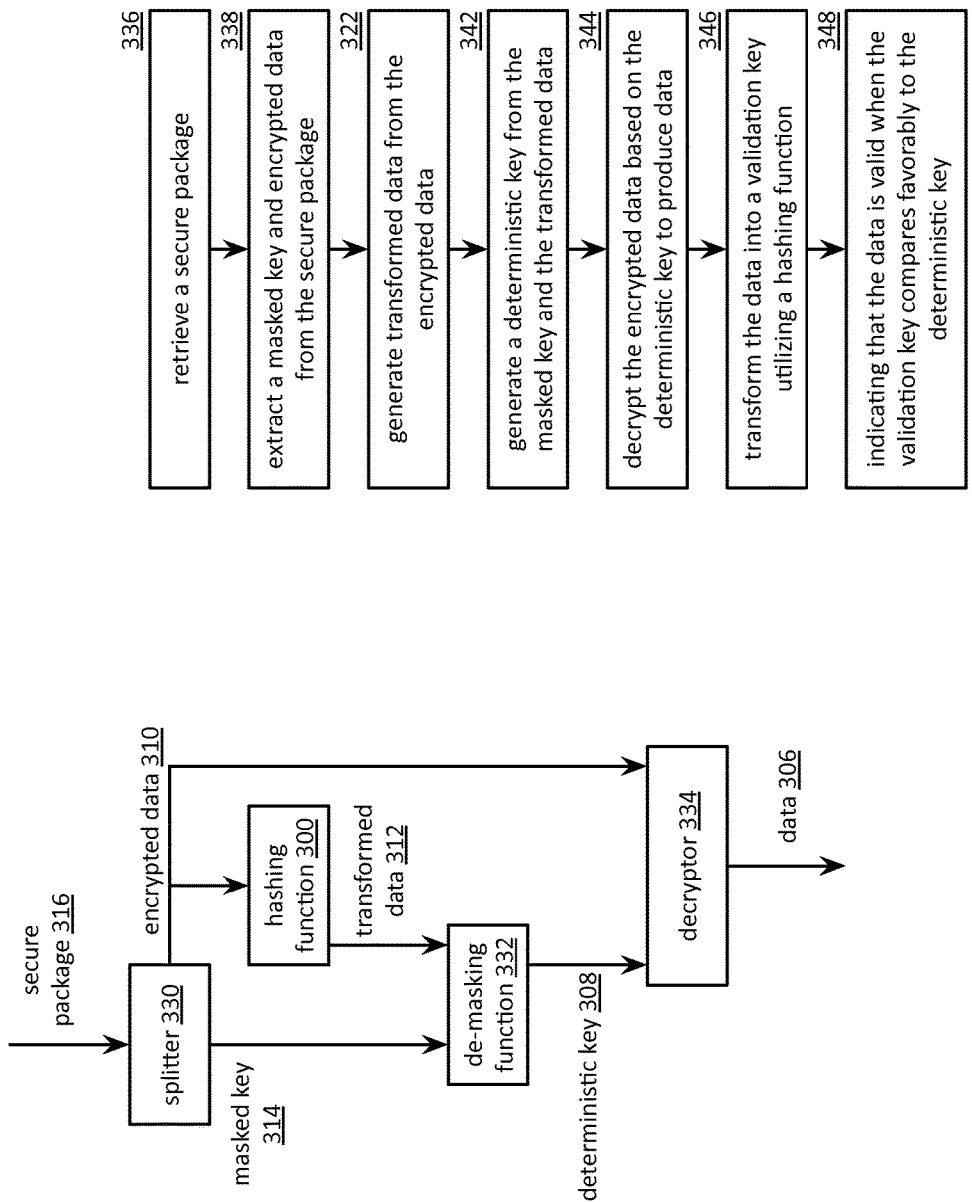

METADATA ACCESS IN A DISPERSED STORAGE NETWORK

CROSS REFERENCE TO RELATED PATENTS

The present U.S. Utility patent application claims priority pursuant to 35 U.S.C. § 119(e) to U.S. Provisional Application Ser. No. 61/357,430, entitled "DISPERSAL METHOD IN A DISPERSED STORAGE SYSTEM," filed Jun. 22, 2010, which is hereby incorporated herein by reference in its entirety and made part of the present U.S. Utility patent application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computing systems and more particularly to data storage solutions within such computing systems.

Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 8A is a flowchart illustrating an example of storing data and metadata in accordance with the invention;

FIG. 8B is a flowchart illustrating an example of retrieving data and metadata in accordance with the invention;

FIG. 9A is a diagram of an example of data mapping to slices in accordance with the invention;

FIG. 9B is a diagram of another example of data mapping to slices in accordance with the invention;

FIG. 10A is a diagram of another example of data mapping to slices in accordance with the invention;

FIG. 10B is a diagram of another example of data mapping to slices in accordance with the invention;

FIG. 10C is a flowchart illustrating an example of encoding data to produce data slices and parity slices in accordance with the invention;

FIG. 18A is a schematic block diagram of an embodiment of a deterministic all or nothing transform (AONT) decoder in accordance with the invention;

FIG. 18B is a flowchart illustrating an example of decoding a secure package to produce data in accordance with the invention;

DETAILED DESCRIPTION OF THE INVENTION

Figure 1:
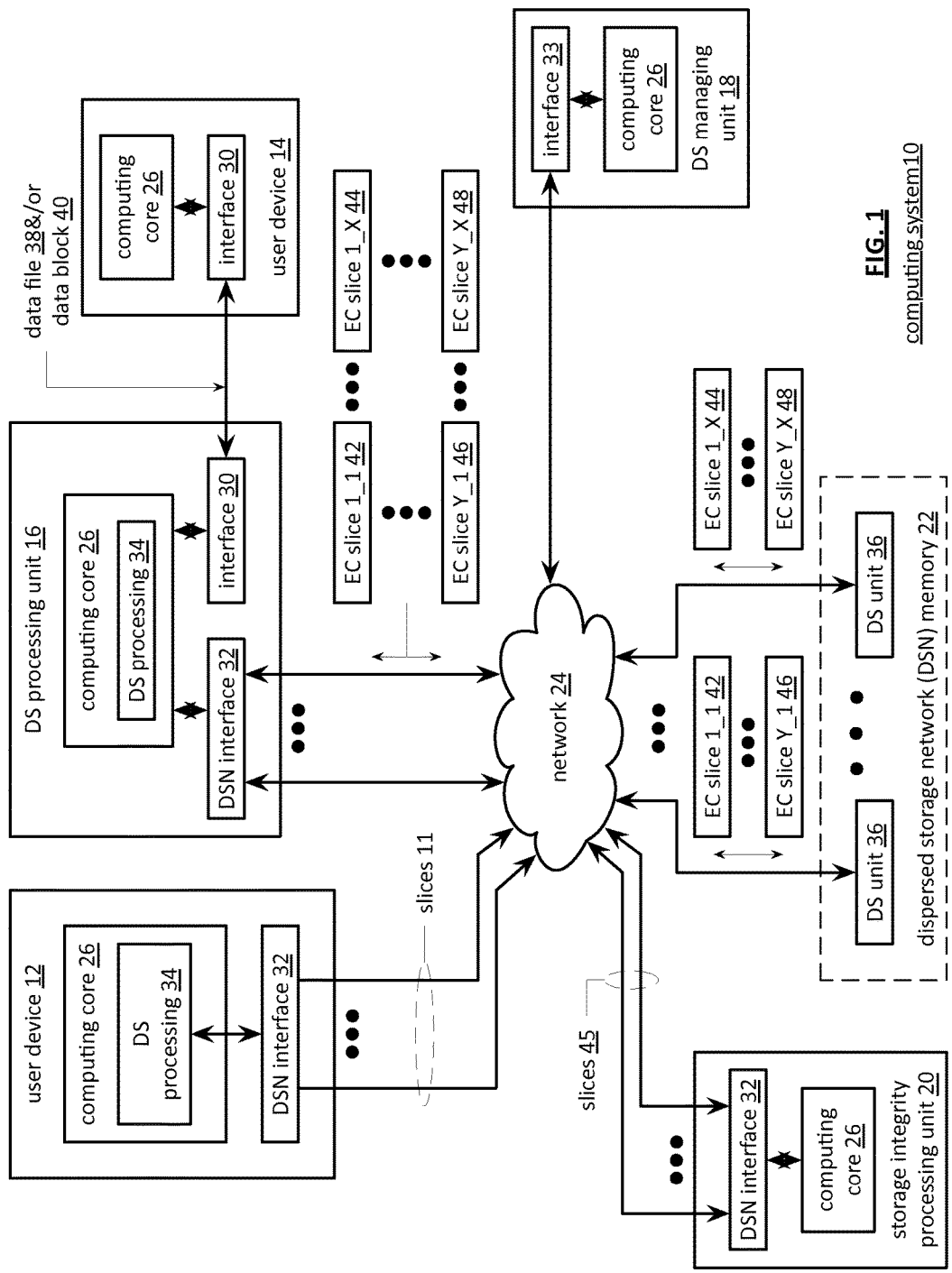
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-26.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interface 30 supports a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing unit 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security. Further examples of encoding the data segments will be provided with reference to one or more of FIGS. 2-26.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuilt slice, or slices, in the appropriate DS unit(s) 36 in a manner that mimics the write process previously described.

Figure 2:
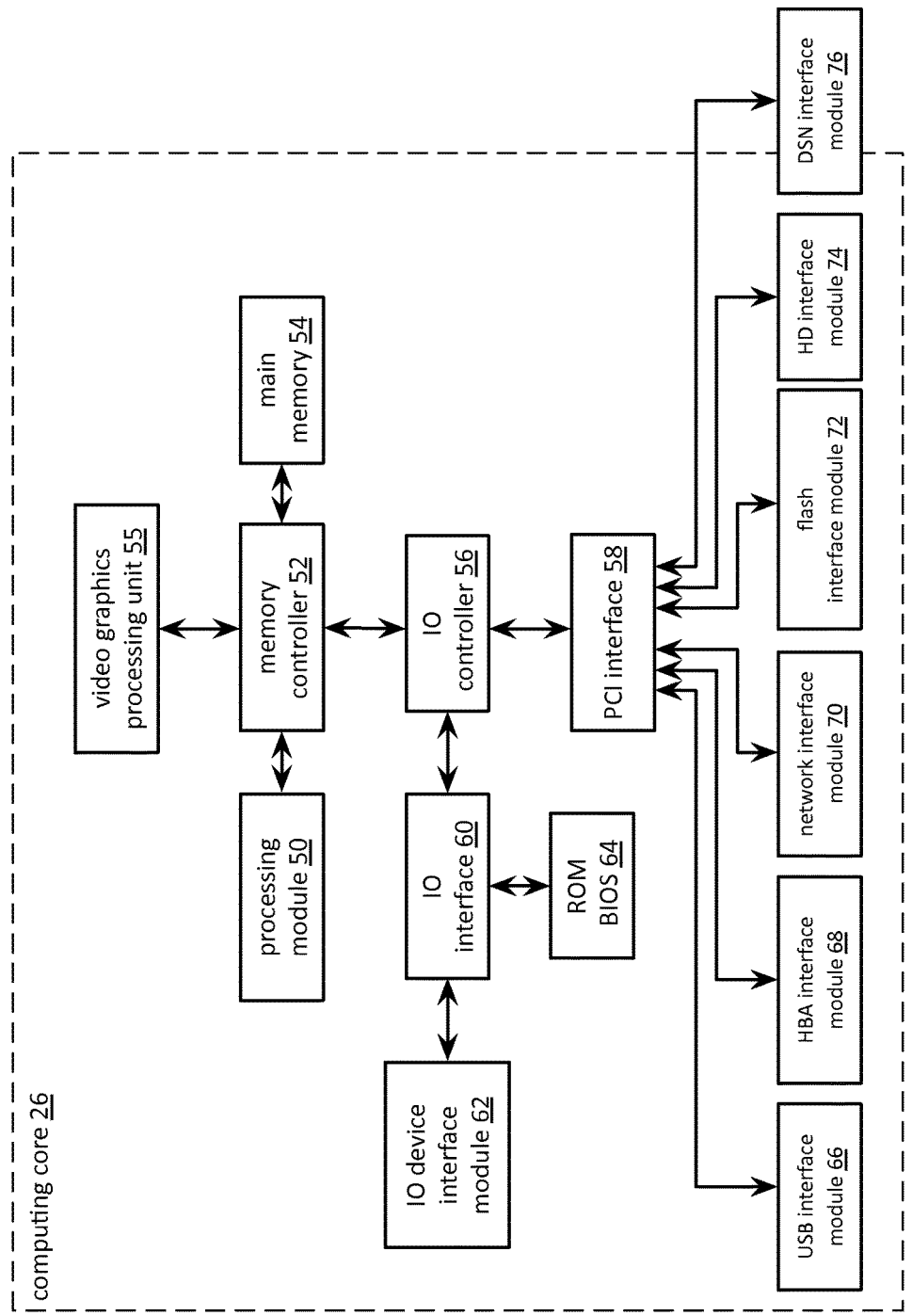
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-26.

Figure 3:
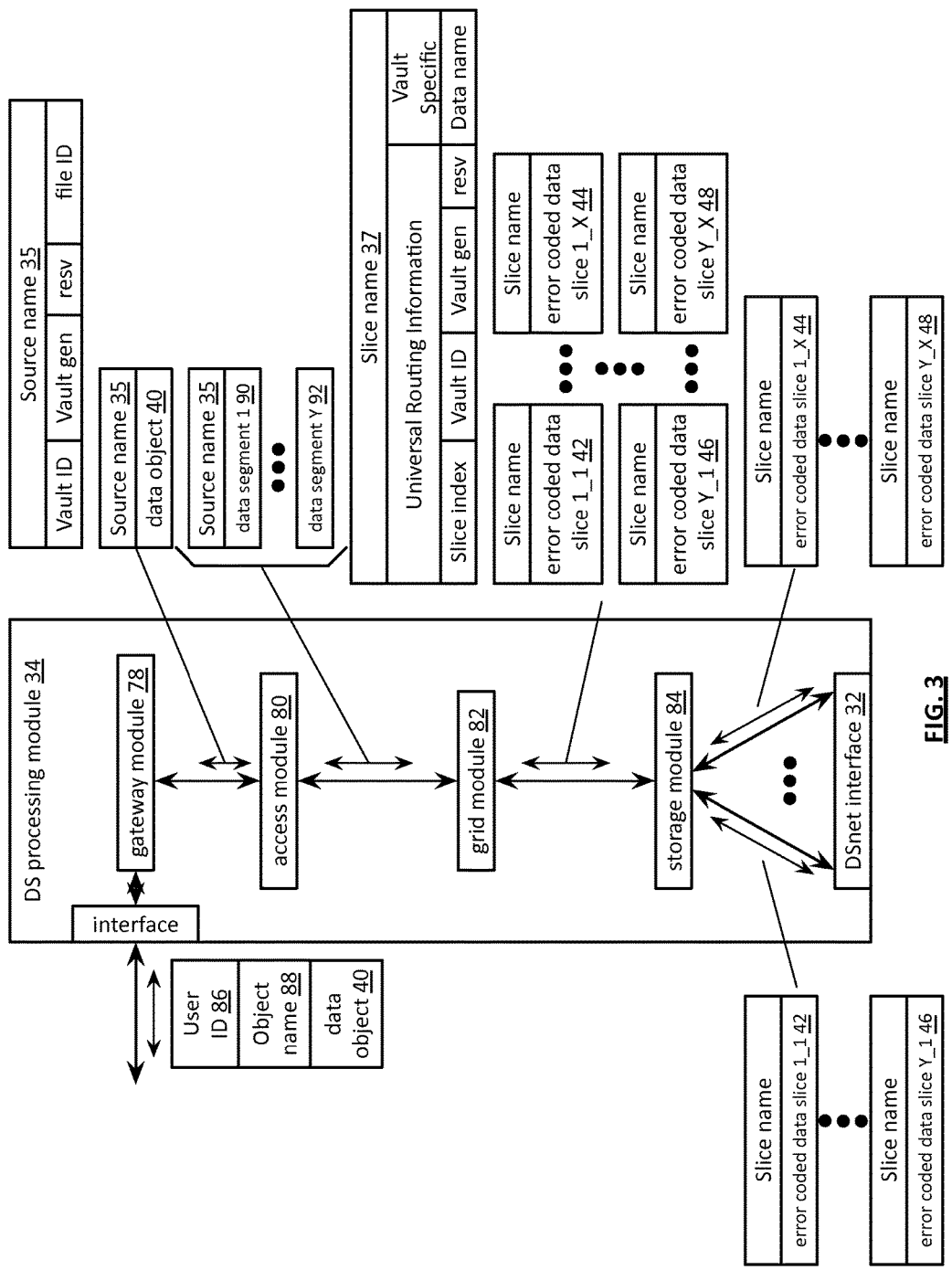
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user 12 or of the DS processing unit 14. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X−T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit 36 attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

Figures 4, 5:
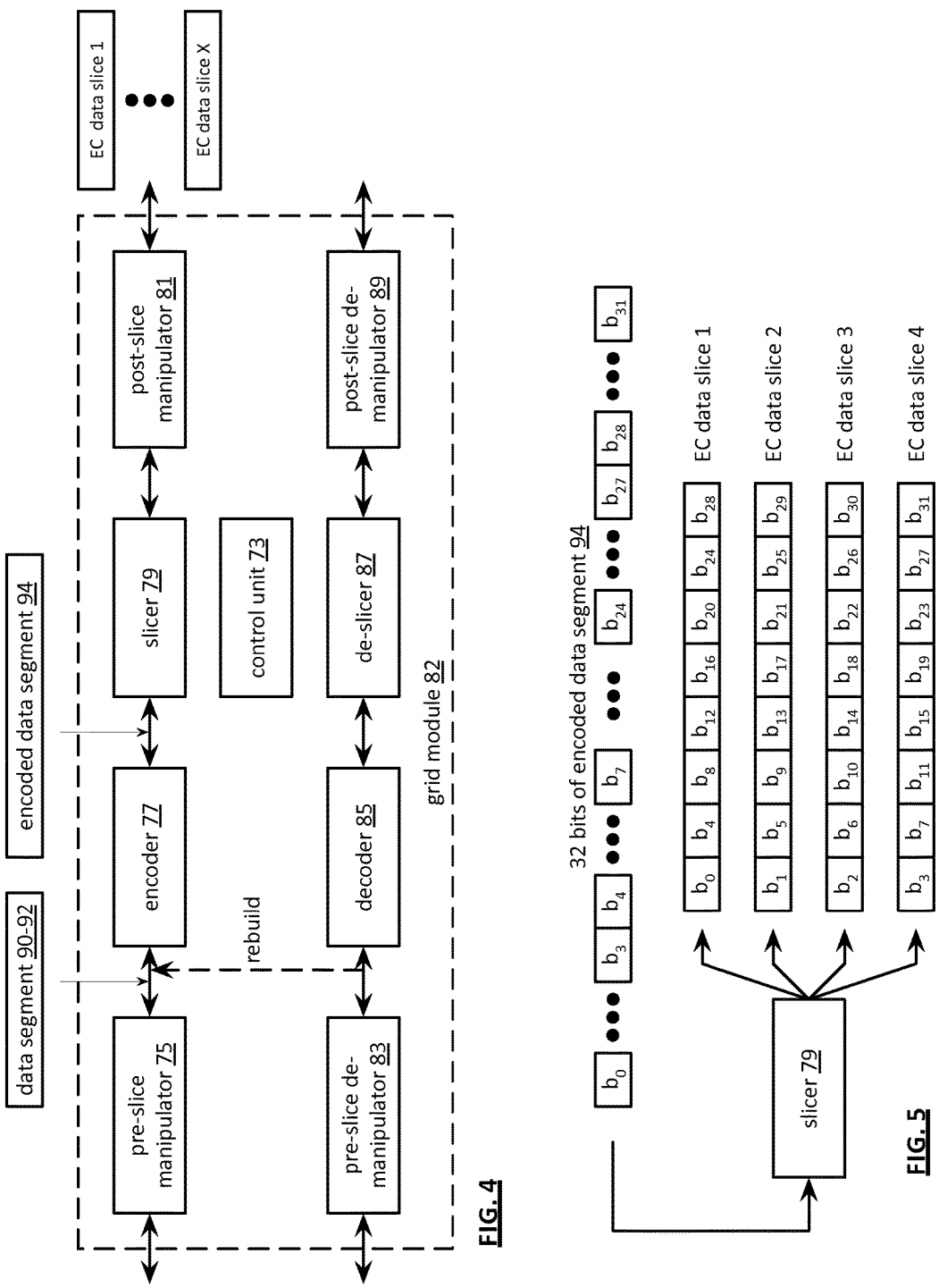
FIG. 4 is a schematic block diagram of an embodiment of a grid module in accordance with the invention.
FIG. 5 is a diagram of an example embodiment of error coded data slice creation in accordance with the invention.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of a write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X−T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment.

FIG. 5 is a diagram of an example of slicing an encoded data segment 94 by the slicer 79. In this example, the encoded data segment includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
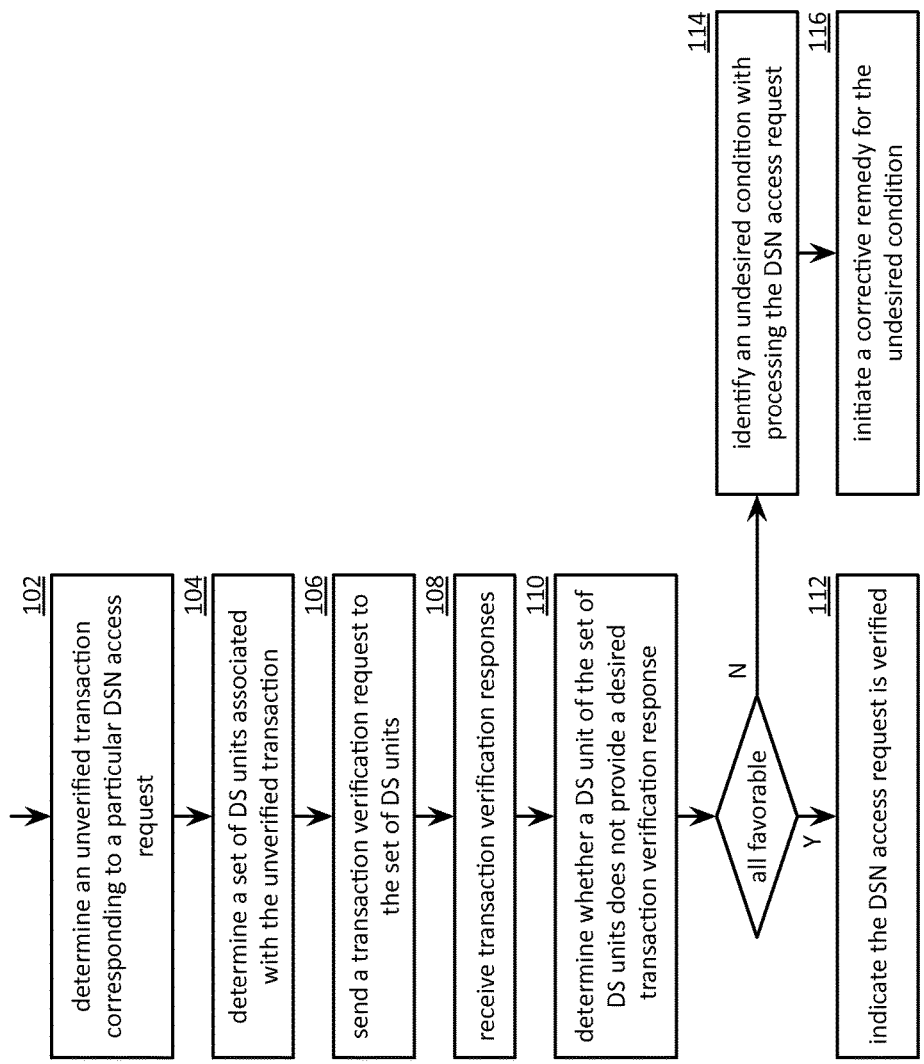
FIG. 6 is a flowchart illustrating an example of verifying a transaction in accordance with the invention.

FIG. 6 is a flowchart illustrating an example of verifying a transaction. The method begins with step 102 where a processing module (e.g., of a dispersed storage (DS) processing unit, of a DS unit) determines an unverified transaction corresponding to a particular dispersed storage network (DSN) access request. Such a DSN access request includes one or more of a transaction number, a read request, a write request, a checked write request, a commit request, a rollback request, and a check request. Such a transaction number may be utilized to associate one or more messages and/or actions with a multistep sequence to accomplish a desired overall result of the DSN access request. Such a transaction number may be generated to populate a first DSN access request wherein the first DSN access request may be part of a plurality of messages and/or actions to facilitate the multistep sequence. Such a transaction number may be utilized to avoid conflicts including attempted simultaneous operations on a same revision of a same slice. Generation of the transaction number includes forming the transaction number based on elapsed seconds since Jan. 1, 1970 UTC with nanosecond, millisecond, and/or seconds of precision. For instance, the transaction number is eight bytes in length.

An unverified transaction corresponds to an indeterminate status (e.g., a desired condition or an undesired condition) associated with a transaction of the DSN access request. For example, a status of an undesired condition includes at least one DS units of a set of DS units that did not receive a DSN access request and has no knowledge of a transaction number associated with the DSN access request. As another example, a status of a desired condition includes each DS unit of the set of DS units did receive the DSN access request and has knowledge of the transaction number. In an instance, the unverified transaction becomes a verified transaction when the indeterminate status transitions to a determinate status by learning whether each DS unit of the set of DS units has knowledge of the transaction number. Such a determination of the unverified transaction may be based on one or more of a transaction table lookup, a query, a command, and a message.

The method continues at step 104 where the processing module determines a set of DS units associated with the unverified transaction. Such a determination may be based on one or more of a virtual DSN address to physical location table query, a list, a DS unit identifier (ID), a transaction table, a vault lookup, a command, and a message.

The method continues at step 106 where the processing module sends a transaction verification request to the set of DS units, wherein the transaction verification request includes the transaction number that corresponds to the particular DSN access request. Such a DSN access request may be sent to the set of DS units concurrent with, or prior to, sending the transaction verification request to the set of DS units.

The method continues at step 108 where the processing module receives transaction verification responses from at least some of the set of DS units to produce received transaction verification responses. Such a transaction verification response may include one or more of a transaction number associated with the at least some of the set of DS units, a transaction number list including transaction numbers actively associated with the at least some of the set of DS units, a hash digest of the transaction number list, and a transaction processing state indicator corresponding to a state of processing each transaction that is currently open (e.g., not fully processed). Alternatively, or in addition to, processing module resends the transaction verification request when a transaction verification response is not received within a time period after the transaction verification request was sent to a particular DS unit of the set of DS units.

The method continues at step 110 where the processing module determines whether a DS unit of the set of DS units does not provide a desired transaction verification response. Such a determination may be based on one or more of whether a transaction verification response was received from the DS unit within a time period, whether the transaction verification response includes the transaction number that corresponds to the particular DSN access request, whether the transaction verification response includes a hash digest that corresponds to the particular DSN access request (e.g., substantially the same as a hash digest from another DS unit), and whether the transaction verification response does not include a transaction number included in a transaction verification response from another DS unit. For example, the processing module determines that the DS unit of the set of DS units does not provide the desired transaction verification response when the transaction verification response does not include the transaction number that corresponds to the particular DSN access request. The method branches to step 114 when processing module determines that the DS unit of the set of DS units does not provide the desired transaction verification response. In such a scenario, the processing module determines that all of the transaction verification responses are not favorable. The method continues to step 112 when the processing module determines that the DS unit of the set of DS units does provide the desired transaction verification response.

The method continues at step 112 where the processing module indicates that the DSN access request is verified when the desired transaction verification responses are favorable. Such verification of the DSN access request includes at least one of indicating that the DSN access request is verified for the DS unit and indicating that the DSN access request is verified for each DS unit of the set of DS units.

The method continues at step 114 where the processing module identifies an undesired condition with processing the DSN access request when the DS unit of the set of DS units does not provide a desired transaction verification response. Such identifying of the undesired condition with processing the DSN access request includes detecting at least one of one of the transaction verification responses does not include the transaction number, the DS unit does not provide the one of the transaction verification responses within a given time period, one of the transaction verification responses indicates that the DS unit did not receive the DSN access request, and the one of the transaction verification responses includes the transaction number that is different from a transaction number included in another one of the transaction verification responses.

The method continues at step 116 where the processing module initiates a corrective remedy for the undesired condition. Such initiating of the corrective remedy for the undesired condition includes one or more of initiating a rebuild function for a data slice associated with the DS unit, wherein the data slice is identifiable based on the transaction number, resending the DSN access request to the set of DS units, sending the DSN access request to another set of DS units, and modifying the DSN access request to produce a modified DSN access request and sending the modified DSN access request to the set of DSN units or the another set of DSN units. Such initiating the rebuild function comprises at least one of rebuilding the data slice to produce a rebuild data slice, sending a rebuilding request to a rebuilding entity, wherein the request includes a slice name of the data slice and wherein the rebuilding entity rebuilds the data slice, and sending the slice name to another DS unit for rebuilding the data slice. Alternatively, or in addition to, the method repeats back to step 102 to analyze another DSN access request.

Figure 7:
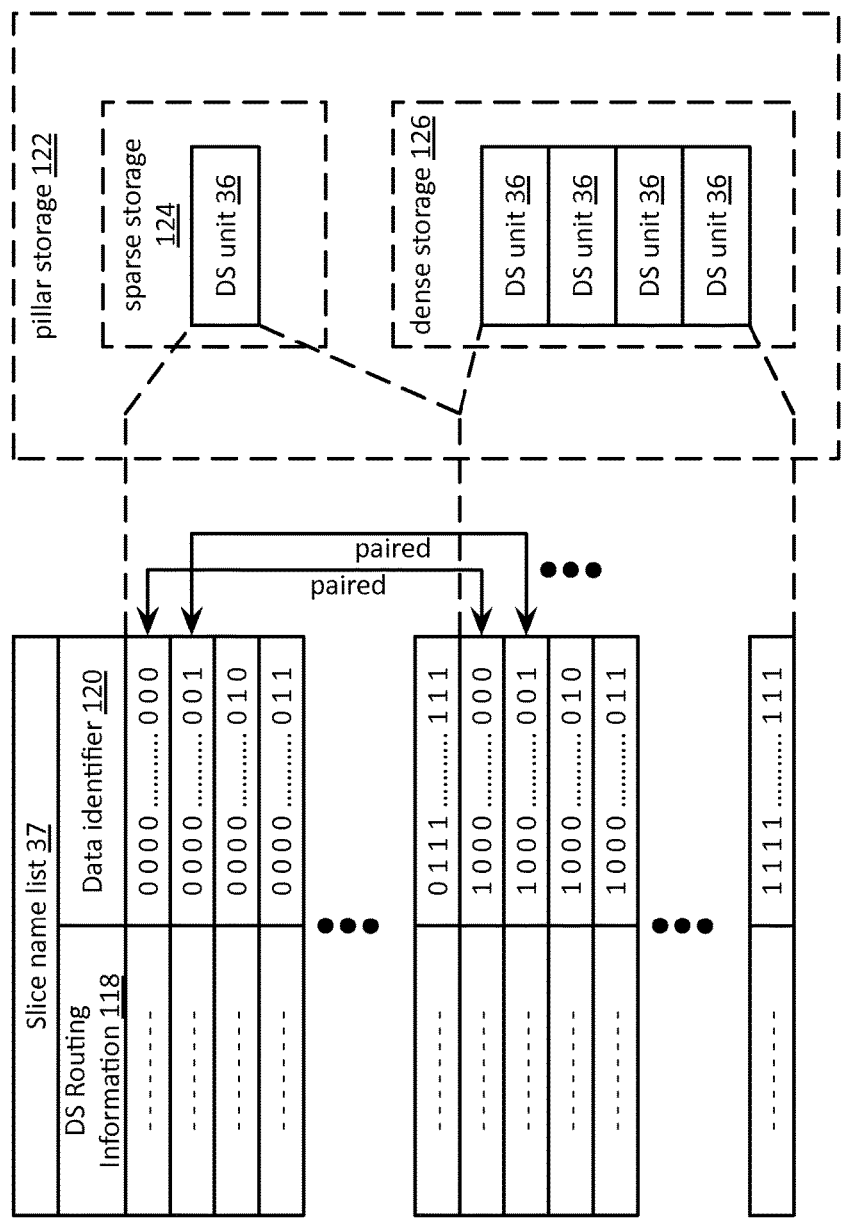
FIG. 7 is a diagram illustrating an example of slice name mapping to dispersed storage resources in accordance with the invention.

FIG. 7 is a diagram illustrating an example of slice name mapping to dispersed storage resources. A slice name mapping includes a slice name list 37 mapped to pillar storage 122. A slice name list 37 includes a plurality of slice name entries. Such a plurality of slice name entries includes one or more data slice name entries and one or more paired metadata slice name entries, wherein a number of metadata slice name entries is substantially the same as a number of data slice name entries. A plurality of slice name entries includes a dispersed storage (DS) routing information field 118 and a data identifier (ID) field 120. A DS routing information field 118 includes a plurality of DS routing information entries (e.g., pillar index, vault ID, generation ID). Such a data ID field 120 includes a plurality of data ID entries (e.g., data/metadata flag, object ID, data segment ID). In an implementation example, the slice name entry is 48 bytes in length, the DS routing information entry is 24 bytes in length, and the data ID entry is 24 bytes in length.

A pillar storage 122 includes sparse storage 124 and dense storage 126. Such a sparse storage 124 includes at least one DS unit 36. Such a dense storage 126 includes one or more DS units 36. Alternatively, the sparse storage 124 and the dense storage 126 share a common DS unit 36. Dense storage 126 may be utilized to store encoded data slices of data such as large data objects and such sparse storage 124 may be utilized to store encoded metadata slices, wherein metadata is associated with the data. Metadata may describe the data including one or more of a data object name, a block number, a source name, slice name, a data type, a data length, an author identifier, access permissions, a creation timestamp, a last modified timestamp, a format indicator, a file type indicator, an image associated with text of the data, text associated with an image of the data, a priority indicator, a security indicator, directory information, and a performance indicator. The metadata may be small in data volume as compared to the data. For example, data may be ten million bytes and associated metadata may be one thousand bytes. Allocation of less memory (e.g., fewer DS units) to sparse storage as compared to the allocation of DS units to dense storage may provide an efficiency improvement to the system.

A data ID field 120 may include a data/metadata flag. For example, a most significant bit of the data ID field 120 is utilized as the data/metadata flag and distinguishes between slice names mapped to the dense storage 126 and slice names mapped to the sparse storage 124. For example, a slice name address containing a data/metadata flag equal to zero is mapped to slice names of metadata to be stored in the sparse storage on 24. As another example, a slice name address containing a data/metadata flag equal to one is to slice names of data to be stored in the dense storage 126. A configuration pairs slice name addresses (e.g., a metadata slice name and a data slice name) that are substantially the same with the exception of the data/metadata flag of the data identifier field. As such, a slice name determination efficiency may be provided when one part of a slice name pair is known (e.g. toggle the most significant bit of the data ID field 120 to produce the slice name of the other). The method of utilization of the mapping is discussed in greater detail with reference to FIGS. 8A-8B.

FIG. 8A is a flowchart illustrating an example of storing data and metadata. The method begins with step 128 where a processing module obtains a data segment store. Such obtaining may be based on one or more of receiving a data object to store, receiving a data segment to store, a command, and a message. For example, the processing module may determine to store one data segment of a data object. The method continues at step 130 where the processing module determines metadata associated with the data segment. The metadata includes at least one of an object identifier (ID), object size, object type, object format, directory information, a file name, a file path, a source name, a dispersed storage network (DSN) address, a snapshot ID, a segmentation allocation table (SAT) source name, object hash, access permissions, and a timestamp. Such a determination may be based on one or more of an analysis of the data, information received with the data, information appended to the data, an inspection of at least one portion of the data, a data object name, a data segment identifier, a table lookup, a predetermination, a command, and a message.

The method continues at step 132 where the processing module dispersed storage error encodes the data segment to produce a set of encoded data slices. The method continues at step 134 where the processing module dispersed storage error encodes the metadata associated with the data segment to produce a set of encoded metadata slices. The method continues at step 136 where the processing module creates a set of data slice names for the set of encoded data slices. Such creation may be based on at least one of a data ID associated with the data segment, a vault ID lookup, a directory lookup, a source name (e.g., including a vault ID, a generation ID, and a object number), a vault source name (e.g., including a source name and a segment number), the set of encoded data slices, a hash of the data segment, and an object number associated with the data ID.

The method continues at step 138 where the processing module creates a set of metadata slice names based on the set of data slice names. Such creation may be based on at least one of toggling a data/metadata flag of a data slice name of the set of data slice names to produce a corresponding metadata slice name of the set of metadata slice names, performing an exclusive OR (XOR) logical function on the data slice name with a naming mask to produce the corresponding metadata slice name, adding a constant value to the data slice name to produce the corresponding metadata slice name, and subtracting the constant value from the data slice name to produce the corresponding metadata slice name.

The method continues at step 140 where the processing module sends the set of encoded data slices and the set of data slice names to a dispersed storage network (DSN) memory, wherein the DSN memory stores an encoded data slice of the set of encoded data slices based on a corresponding one of the set of data slice names using a first level of memory allocation. For example, when two dispersed storage (DS) units are utilized, the processing module sends the encoded data slice and the corresponding one of the set of data slice names to a first DS unit of the DSN memory, wherein memory space of the first DS unit is partitioned in accordance with the first level of memory allocation (e.g., allocated to the storage of large encoded data slices). As another example, when one DS unit is utilized, the processing module sends the encoded data slice and the corresponding one of the set of data slice names to the DS unit of the DSN memory, wherein a first portion of memory space of the DS unit is partitioned in accordance with the first level of memory allocation.

The method continues at step 142 where the processing module sends the set of encoded metadata slices and the set of metadata slice names to the DSN memory, wherein the DSN memory stores an encoded metadata slice of the set of encoded metadata slices based on a corresponding one of the set of metadata slice names using a second level of memory allocation, and wherein the second level of memory allocation is smaller than the first level of memory allocation. For example, when the two DS units are utilized, the processing module sends the encoded metadata slice and the corresponding one of the set of metadata slice names to a second DS unit of the DSN memory, wherein memory space of the second DS unit is partitioned in accordance with the second level of memory allocation (e.g., allocated to the storage of smaller encoded metadata slices). As another example, when the one DS unit is utilized the processing module sends the encoded metadata slice and the corresponding one of the set of metadata slice names to the DS unit, wherein a second portion of the memory space of the DS unit is partitioned in accordance with the second level of memory allocation.

FIG. 8B is a flowchart illustrating an example of retrieving data and metadata. The method begins with step 144 where a processing module determines a set of data slice names corresponding to a data segment previously stored in a dispersed storage network (DSN) memory as a set of encoded data slices. Such a determination may be based on one or more of a lookup, a data identifier (ID), a data segment ID, a predetermination, and a message. The method continues at step 146 where the processing module determines a set of metadata slice names based on the set of data slice names, wherein the metadata slice names correspond to metadata previously stored in the DSN memory as a set of encoded metadata slices.

The method continues at step 148 where the processing module retrieves at least a decode threshold number of encoded data slices of the set of encoded data slices from the DSN memory to produce received encoded data slices utilizing the set of data slice names, wherein the DSN memory retrieves an encoded data slice of the set of encoded data slices based on a corresponding one of the set of data slice names using a first level of memory allocation. The method continues at step 150 where the processing module retrieves at least a decode threshold number of encoded metadata slices of the set of encoded metadata slices from the DSN memory to produce received encoded metadata slices utilizing the set of metadata slice names, wherein the DSN memory retrieves an encoded metadata slice of the set of encoded metadata slices based on a corresponding one of the set of metadata slice names using a second level of memory allocation, and wherein the second level of memory allocation is smaller than the first level of memory allocation.

The method continues at step 152 where the processing module dispersed storage error decodes the received encoded data slices to reproduce the data segment. Alternatively, or in addition to, the processing module may dispersed storage error decode the received encoded data slices in accordance with special dispersal parameters. For example, the processing module dispersed storage error decodes the received encoded data slices based on special dispersal parameters from the metadata to reproduce the data segment. Alternatively, or in addition to, the processing module transforms the data segment utilizing a metadata function to produce transformed data in accordance with the metadata and sends the transformed data to a requesting entity. For example, processing module transforms the data utilizing a data decompression algorithm of the metadata to produce the transformed data. The method continues at step 154 where the processing module dispersed storage error decodes the received encoded metadata slices to reproduce the metadata.

FIG. 9A is a diagram of an example of data mapping to slices. Data 156 is segmented to produce a plurality of data segments 158, wherein each successive data segment 158 includes successive portions of the data 156 from the beginning to the end. Each data segment 158 is dispersed storage error encoded to produce a plurality of slices 1-8. Such a plurality of slices 1-8 includes the data segment 158 as slices 1-5 and parity 160 as slices 6-8 when a pillar width n=8 and a decode threshold k=5 and an encoding matrix of the dispersed storage error encoding includes a unity matrix (e.g., generating slices 1-5 to be substantially the same as the data segment 158). Generation and structure of the data segment 158 is discussed in greater detail with reference to FIG. 10A.

FIG. 9B is a diagram of another example of data mapping to slices. Data 156 is segmented to produce a plurality of data segments 162, wherein each successive byte of data segment 162 includes every kth byte of the data 156 from the beginning to the end (e.g., decode threshold=k). Each data segment 162 is dispersed storage error encoded to produce a plurality of slices 1-8. Such a plurality of slices 1-8 includes the data segment 162 as slices 1-5 and parity 164 as slices 6-8 when a pillar width n=8 and a decode threshold k=5 and an encoding matrix of the dispersed storage error encoding includes a unity matrix (e.g., generating slices 1-5 to be substantially the same as the data segment 162). Generation and structure of the data segment 162 is discussed in greater detail with reference to FIG. 10B.

FIG. 10A is a diagram of another example of data mapping to slices. The mapping includes data 166 mapped into a final segment matrix 168. The data 166 includes any data file type, including text, such as a text string "the quick brown dog jumps high." A data segment is created by selecting each successive byte of the text string such that each slice includes successive characters of the data segment when the unity matrix is utilized in an error coding dispersal storage function. For example, slice one contains a first character set "the qu", and slice 2 contains a second character set "ick br", etc. A resulting file segment matrix 168 includes a decode threshold number of rows. Each row of the final segment matrix 168 forms a slice.

FIG. 10B is a diagram of another example of data mapping to slices. The data mapping includes data 166 mapped to a transposition segment matrix 170, which is mapped to a final segment matrix 172. A transposition segment matrix includes a number of columns substantially the same as a decode threshold (e.g., k) and a number of rows based on data segment size and the number of columns. The transposition segment make its 170 is inverted the form the final segment matrix 172. As such, slices of the resulting final segment matrix 172 are formed based on selecting every kth character of the original data string. A data segment is formed based on selecting the next successive string characters such that the data segment size is completed (e.g., rows multiplied by columns). Such characters of the text string are filled in from left to right in successive order. For example, a first row includes characters "the q", a second row includes characters "uick", a third row includes characters "brown", etc. as shown. Next, characters from the transposition matrix are utilized to create the data slices. As illustrated, a slice 1 row is formed from column 1 characters of the transposition matrix. For example, slice 1 contains characters "tub j". As another example, a slice 2 contains characters "hirduh", a slice 3 contains the characters "ecoomi", a data slice 4 contains characters "kwgpg", and a slice 5 contains the characters "q n sh". Parity slices 6-8 are formed from slices 1-5 in accordance with an error coding dispersal storage function. In an alternative embodiment, parity data slices 6-8 are formed from the transposition matrix in accordance with the error coding dispersal storage function. The method of operation to generate data slices is discussed in greater detail with reference to FIG. 10C.

FIG. 10C is a flowchart illustrating an example of encoding data to produce data slices and parity slices. A method begins at step 174 where processing module creates a data segment from data. For example, the processing module may select a next successive set of bytes of the data, wherein a number of the set of bytes a data segment size. As illustrated in FIG. 10B, the data segment may be represented by the string "the quick brown dog jumps high". Alternatively, the processing module may create the data segment by selecting every kth (e.g., decode threshold) byte of the data where each data segment is offset by one byte.

The method continues at step 176 where the processing module creates a transposition matrix based on the data segment. A number of columns of the transposition matrix equals the decode threshold k. The method continues at step 178 where the processing module creates k data slices based on the transposition matrix. A number of rows of the slices equals the threshold k when a unity matrix is utilized as part of an associated error coding dispersal storage function. The processing module forms the data slice from the characters of the corresponding column of the transposition matrix.

The method continues at step 180 where the processing module creates n-k parity slices based on the k slices in accordance with the error coding dispersal storage function. Alternatively, or in addition to, the processing module forms the parity slices from the transposition matrix in accordance with the error coding dispersal storage function.

A processing module may subsequently decode the slices encoded as described above. In such a method, a processing module receives a decode threshold k number of data slices, creates the transposition matrix by forming the columns of the transposition matrix from the received data slices, and produces the data segment based on aggregating the rows of the transposition matrix back into the original data segment.

Figure 11:
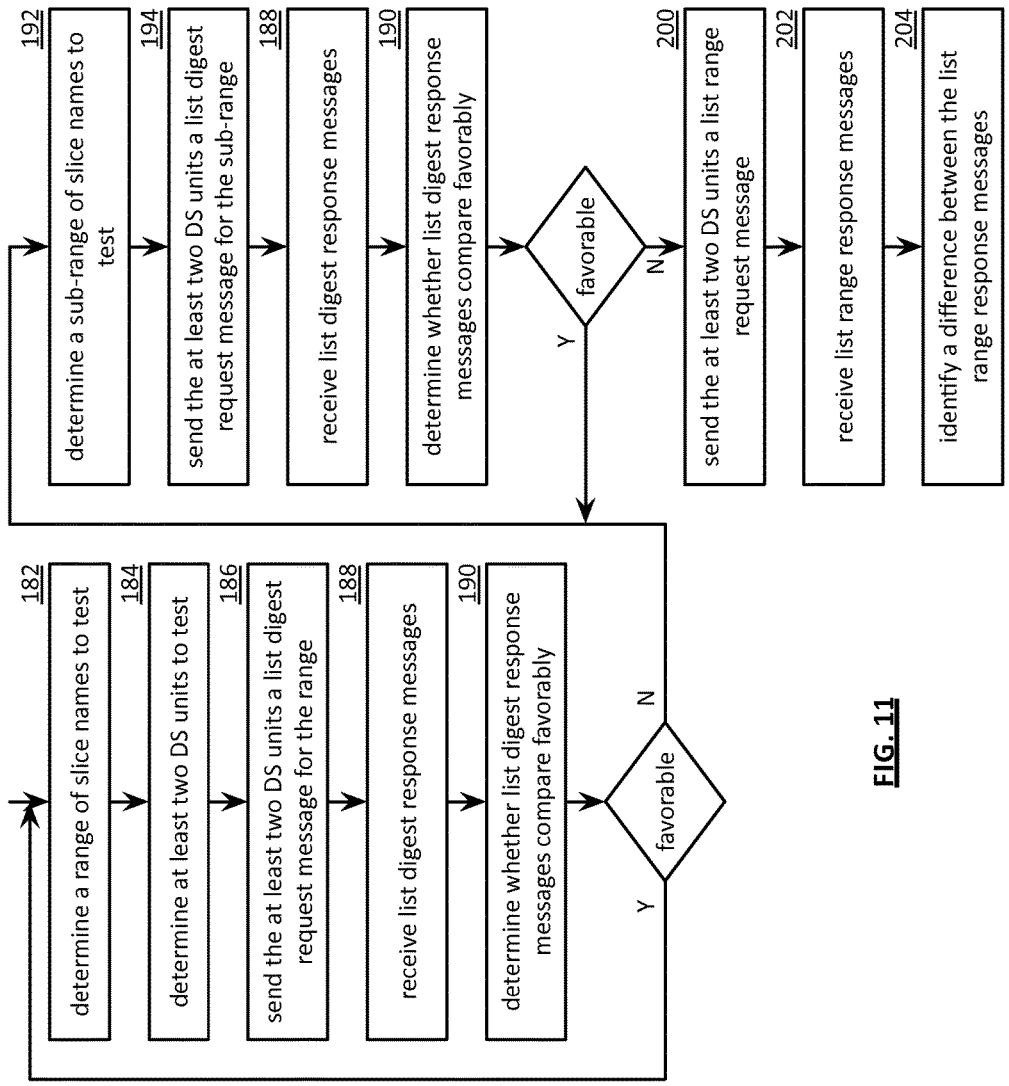
FIG. 11 is a flowchart illustrating an example of identifying a slice error in accordance with the invention.

FIG. 11 is a flowchart illustrating an example of identifying a slice error. A slice error includes one or more of a missing slice, a slice of the wrong revision, and a slice that fails an integrity check. The method begins with step 182 where a processing module determines a range of slice names to test for slice errors. Such a determination may be based on one or more of where a process left off last time, a predetermination, a list, an error message, and a command. The method continues at step 184 where the processing module determines at least two dispersed storage (DS) units to test such that the at least two DS units are included in a common DS unit storage set utilized to store data slices within the range of slice names to test. Such a determination may be based on one or more of a lookup in a dispersed storage network (DSN) address to physical location table, a DS unit storage set list, a message, and a command.

The method continues at step 186 where the processing module sends the at least two DS units a list digest request message. A list digest request message includes at least one of a start slice name, an end slice name, and a maximum response count, wherein the start slice name and the end slice name are based on the range of slice names to test (e.g., a portion of the range). A targeted DS unit receives the list digest request message and calculates a hash of a slice name and revision list, but excluding a pillar index field of the slice name, over the range of slice names between the start slice name and the end slice name. The targeted DS unit sends a list digest request response message to the processing module. Such a list digest response message includes at least one of a digest, a digest length, a last slice name, and a slice count. The method continues at step 188 where the processing module receives two or more list digest response messages from the two or more DS units to produce received list digest responses.

The method continues at step 190 where the processing module determines whether the received list digest responses compare favorably to each other. For example, the processing module determines that the comparison is favorable when the digests are substantially the same from two or more DS units. A test may provide a system improvement since it is a relatively quick way to determine whether the same slice revisions are stored in each of the DS units of the same DS unit storage set over the slice name range. The method repeats back to step 182 when the processing module determines that the list digest request response messages compare favorably (e.g., no slice errors). The method continues to step 192 when the processing module determines that the received list digest responses do not compare favorably.

The method continues at step 192 where the processing module determines a sub-range of slice names to test. Such a determination may be based on one or more of the range of slice names to test, a predetermined size of the range, a priority indicator, a performance indicator, a list, an error history record lookup, a command, and a message. The method continues with step 194 where the processing module sends the at least two DS units a list digest request message corresponding to the sub-range of slice names (e.g., a start slice name and an end slice name correspond to the sub-range). The method continues at step 188 where the processing module receives list digest response messages.

The method continues at 190 where the processing module determines whether the list digest response messages compare favorably (e.g., for the sub-range of slice names). The method loops back to step 192 to test another sub-range within range of slice names tested when the processing module determines that the list digest response messages compare favorably for the (current) sub-range of slice names. The loop repeats until the processing module identifies at least one sub-range of slice names where a slice error exists (e.g., that caused the initial comparison of digests to fail). The processing module may test all possible sub-ranges of slice names such that all slice names of the original slice name range are tested to identify all possible slice errors. The method continues to step 200 when the processing module determines that the list digest request response messages do not compare favorably over the sub-range of slice names.

The method continues at step 200 where the processing module sends the at least two DS units a list range request message. Such a list range request message may include a start slice name, an end slice name, and a maximum response count. A targeted DS unit receives the request, produces list range response message, and sends the list range response message to the processing module. A list range response message may include the following for each slice name: a slice revision count, a slice revision and slice length for each slice revision.

The method continues at step 202 where the processing module receives list range response messages from the DS units. The method continues at step 204 where the processing module identifies a difference between the list range request response messages by comparing the messages. The identification reveals DS units storing pillar slices of different revisions, different slices, or missing slices. Alternatively, or in addition to, the processing module initiates a rebuilding process to rebuild data slices in error.

Figure 12:
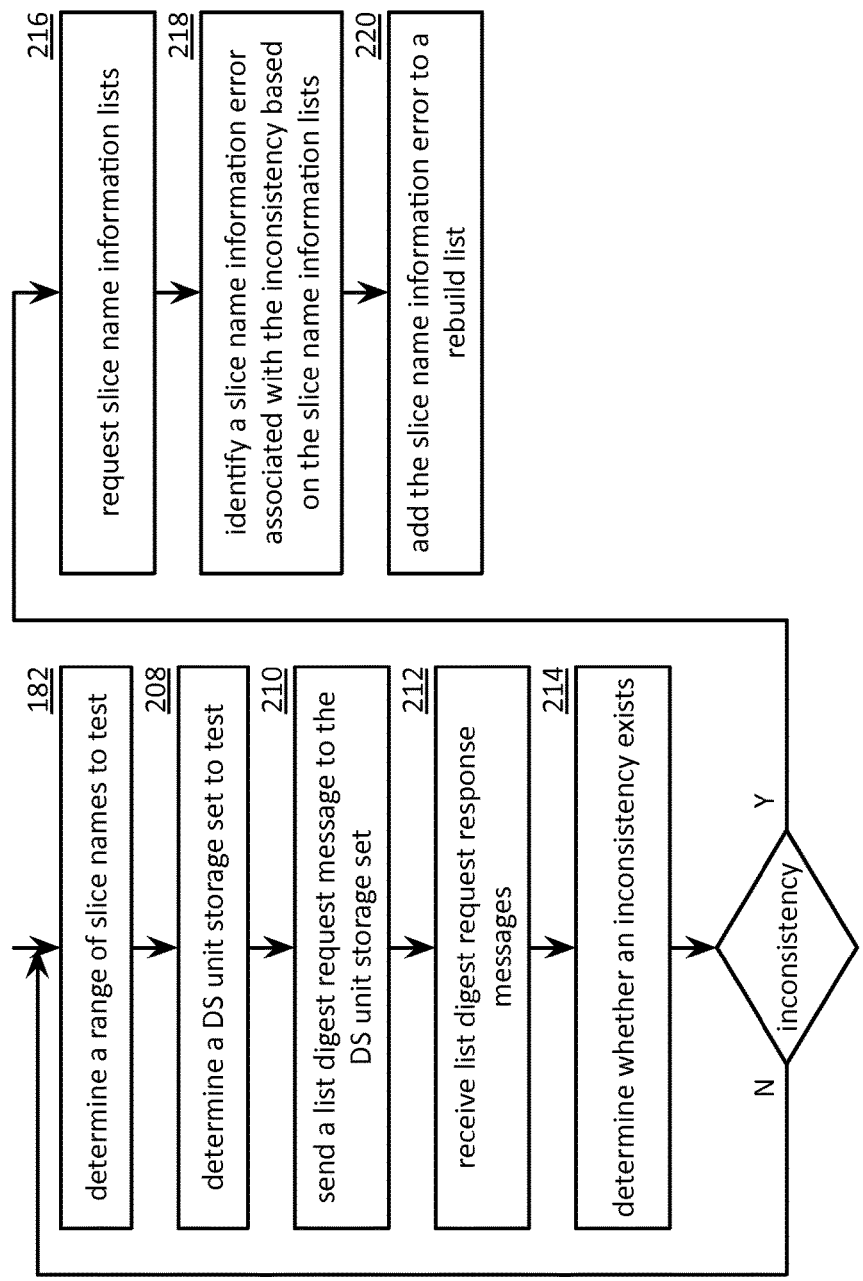
FIG. 12 is a flowchart illustrating another example of identifying a slice error in accordance with the invention.

FIG. 12 is a flowchart illustrating another example of identifying a slice error, which includes similar steps to FIG. 11. The method begins with step 182 of FIG. 11 where processing module determines a range of slice names test. The method continues at step 208 where the processing module determines a dispersed storage (DS) unit set to test. Such a determination may be based on one or more of a lookup in a dispersed storage network (DSN) address to physical location table, a DS unit storage set list, a message, and a command.

The method continues at step 210 where the processing module sends list digest requests to the set of DS units, wherein a list digest request of the list digest requests is requesting a representation of a slice name information list regarding encoded data slices stored by a DS unit of the set of DS units. A slice name information list includes a plurality of entries for a range of slice names, wherein an entry of the plurality of entries includes a slice name of a corresponding one of the encoded data slices, a slice revision count indicating a number of revisions of the slice name, and for a revision of the revisions of the slice names a revision number and a slice length indicator. A representation of the slice name information list includes at least one of a hash value resulting from a hash function performed on entries of the slice name information list, a compression value resulting from a compression function performed on entries of the slice name information list, a checksum value resulting from a checksum function performed on the entries of the slice name information list, a hash-based message authentication code (HMAC) value resulting from an HMAC function performed on the entries of the slice name information list, and a mask generating function (MGF) value resulting from an MGF performed on the entries of the slice name information list. Such performing of the hash function on the entries of the slice name information list may exclude a pillar index portion of a slice name (e.g., since the pillar index portion will be different between slice names of different pillars for the same data segment).

The method continues at step 212 where the processing module receives list digest responses from at least some of the set of DS units. A list digest response includes one or more of hash value (e.g., a digest), a digest length, a last slice name (e.g., a last slice name associated with the hash value or a slice name in a subsequent test), and a slice count (e.g., a number of slice names included in the hash value).

The method continues at step 214 where the processing module determines whether an inconsistency exists between first and second list digest responses of the list digest responses. Such determining whether the inconsistency exists between the first and the second list digest responses includes at least one of a first hash value of the first list digest response is not substantially equal to a second hash value of the second list digest response, a first checksum value of the first list digest response is not substantially equal to a second checksum value of the second list digest response, a first HMAC value of the first list digest response is not substantially equal to a second HMAC value of the second list digest response, and a first MGF value of the first list digest response is not substantially equal to a second MGF value of the second list digest response.

The method loops back to step 182 of FIG. 11 to test another range of slice names when the processing module determines that the inconsistency does not exist between the first and second list digest responses. The method continues to step 216 when the processing module determines that the inconsistency does exist between the first and second list digest responses.

The method continues at step 216 where the processing module requests at least a portion of each of the slice name information lists from first and second DS units of the set of DS units, wherein the first DS unit provided the first list digest response and the second DS unit provided the second list digest response. The processing module receives the at least the portion of each of the slice name information lists from the first and second DS units.

The method continues at step 218 with a processing module identifies a slice name information error associated with the inconsistency based on the at least a portion of each of the slices name information lists of the first and second DS units. A slice name information error includes at least one of a missing encoded data slice error, a non-deleted encoded data slice error (e.g., an extra slice that should not exist), and a revision error (e.g., a revision count difference, a different slice revision number, a different slice length). The identifying of the slice name information error includes establishing the at least a portion of the slice name information list from the first DS unit as a current slice name information list and identifying an entry of the at least a portion of the slice name information list from the second DS unit that differs from a corresponding entry of the at least a portion of the slice name information list from the first DS unit to identify the slice name information error. The establishing the at least a portion of the slice name information list from the first DS unit as the current slice name information list includes determining that the at least a portion of the slice name information list from the first DS unit substantially matches at least a portion of the slice name information list from a third DS unit of the set of DS units.

The method continues at step 220 where the processing module adds the slice name information error to a rebuild list. Alternatively, or in addition to, the processing module facilitates initiation of a rebuilding process to remedy the slice name information error. Alternatively, or in addition to, the method loops back to step 216 to request slice name information lists for a different portion of the slice name information lists (e.g., when the slice name information error has not been identified). Alternatively, or in addition to, the method loops back to step 182 of FIG. 11 to test another range of slice names.

Figure 13C:
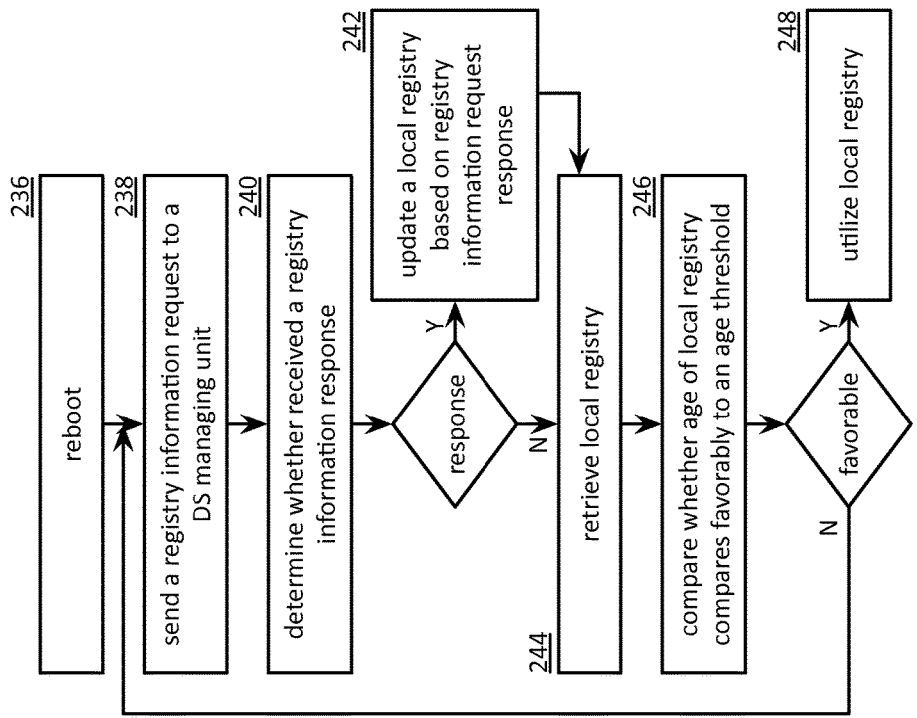
FIG. 13C is a flowchart illustrating an example of acquiring registry information in accordance with the invention.
Figure 13A:
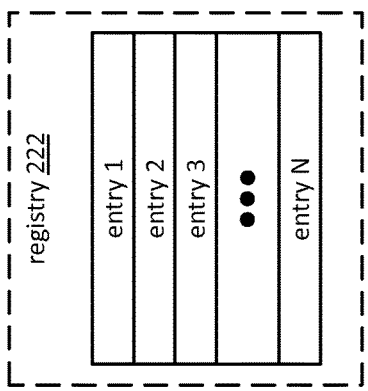
FIG. 13A is a diagram illustrating an example of a registry structure in accordance with the invention.

FIG. 13A is a diagram illustrating an example of a registry structure. A registry structure includes a registry 222, which includes a plurality of entries 1-N. The entries include configuration and operational information associated with a dispersed storage network (DSN). The registry information may be utilized by one or more DSN system elements, processing modules, computing devices, nodes, and units of the DSN. For example, a dispersed storage (DS) unit boots up and requires registry information to invoke an appropriate initial configuration and sustained operation. The registry information may change from time to time as a function of one or more of software updates, security breaches, failures, new hardware, system architecture changes, power conditions, network failures, operational requirements, performance requirements, etc. The structure and contents of a typical registry entry is illustrated with reference to FIG. 13B. A method to acquire registry information is discussed with reference to FIG. 13C.

Figure 13B:
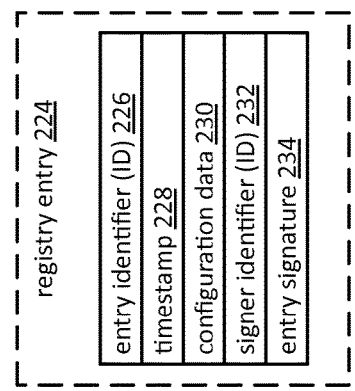
FIG. 13B is a diagram illustrating an example of a registry entry in accordance with the invention.

FIG. 13B is a diagram illustrating an example of a registry entry 224. A registry entry 224 includes one or more of an entry identifier (ID) 226, a timestamp 228, configuration data 230, a signer identifier (ID) 232, and an entry signature 234. The entry ID 226 includes a reference number associated with the registry entry and may be utilized to locate similar registry entries. Each entry ID 226 is unique and never reused. Alternatively, the entry ID 226 is reused but can be distinguished from other entry IDs other utilizing the timestamp 228 associated with the entry ID 226. The timestamp 228 may represent a system timestamp when the registry entry was created, received, verified, or processed by an element of the DSN system. For example, a dispersed storage (DS) managing unit creates a timestamp 228 based on present time of a clock when a new registry entry is created. As another example, a DS unit overwrites the timestamp 228 based on the present time of a clock when the registry entry 224 is received from the DS managing unit.

The configuration data 230 may be utilized by any element of a dispersed storage network (DSN) to configure and operate in accordance with the registry entry. The configuration data 230 may include one or more of slice name range assignments, node internet protocol addresses, certificate authority addresses, authentication authorities addresses, vault identifiers, access control information, digital certificates, application software, driver software, verbal numbers, threshold numbers, etc.

The signer ID 232 represents an identity of a system element that created and authenticated the registry entry 224 by way of populating the entry signature 234 with a valid signature. For example, the DS managing unit may populate the signer ID 232 with an identity of the DS managing unit when the DS managing unit creates the registry entry 224.

The entry signature 234 is populated with a signature to validate the registry entry 224. For example, a processing module of the DS managing unit calculates a hash of registry element fields not including the entry signature 234 to produce a hash of the registry entry 224. The processing module encrypts the hash of the registry entry 224 to produce the entry signature 234 utilizing a private key associated with a private/public key pair of the DS managing unit. The processing module may store the completed signed registry entry 224 in preparation for distribution to elements of the DSN. The processing module of the DS managing unit may distribute the public key to elements of the DSN. Alternatively, or in addition to, the public key is included in the registry entry 224 such that the public key is distributed as part of the registry entry 224. Elements of the DSN utilizes the public key to decrypt the entry signature 234 and compare it to a calculated hash of the registry entry 224 to validate the registry entry 224 as described in greater detail with reference to FIG. 16.

FIG. 13C is a flowchart illustrating an example of acquiring registry information. The method begins with step 236 where a processing module reboots to restart a processing module operation. The method continues at step 238 where the processing module sends a registry information request to a dispersed storage (DS) managing unit. Alternatively, the processing module sends the registry information request to any other module, element, node, unit of a dispersed storage network (DSN). For example, the processing module sends the registry information request to a processing module of a DS unit. As another example, the processing module sends the registry information request to a publisher.

The registry information request may include a processing module identifier of the processing module and a request command for registry information. The registry information may include a portion of the registry as described with reference to FIGS. 13A-13B. For example, the processing module requests a portion that includes most recent registry entry changes. As another example, the processing module requests the entire registry. As yet another example, the processing module requests registry entries that include only certain types of configuration data (e.g., those that relate only to a DS unit).

The method continues at step 240 where the processing module determines whether a registry information response has been received. Such a determination may be based on determining that the registry information request response has not been received if the response has not been received within an elapsed time period from the registry information request. The method branches to step 244 when the processing module determines that the registry information response has not been received. The method continues to step 242 when the processing module determines that the registry information response has been received. The method continues at step 242 where the processing module updates a local registry based on the registry information response. For example, the processing module saves received registry information as current registry information in the local registry (e.g., stored within the DS unit).

The method continues at step 244 where the processing module retrieves the local registry. The local registry includes newer updates when the processing module received the registry information response and may not include newer updates, and may be outdated, when the processing module did not receive the registry information response. The method continues at step 246 where the processing module compares an age of the local registry to an age threshold based on a timestamp of the local registry compared to the age threshold (e.g., where the age threshold is a predetermined or stored number). Alternatively, the age threshold is dynamic number as a function of a performance indicator and/or security indicator.

The method repeats back to step 238 when the processing module determines that the comparison of the age of the local registry to an age threshold is not favorable (e.g., the local registry is too old). In such a scenario, the processing module attempts to acquire more recent registry information. The method continues to step 248 when the processing module determines that the comparison of the age of the local registry to the age threshold is favorable (e.g., the local registry is new enough). The method continues at step 248 where the processing module utilizes the local registry. In addition, the processing module may continue rebooting utilizing the local registry information to start and control applications and variable states as influenced by configuration data of one or more registry entries of the registry information.

Figure 14:
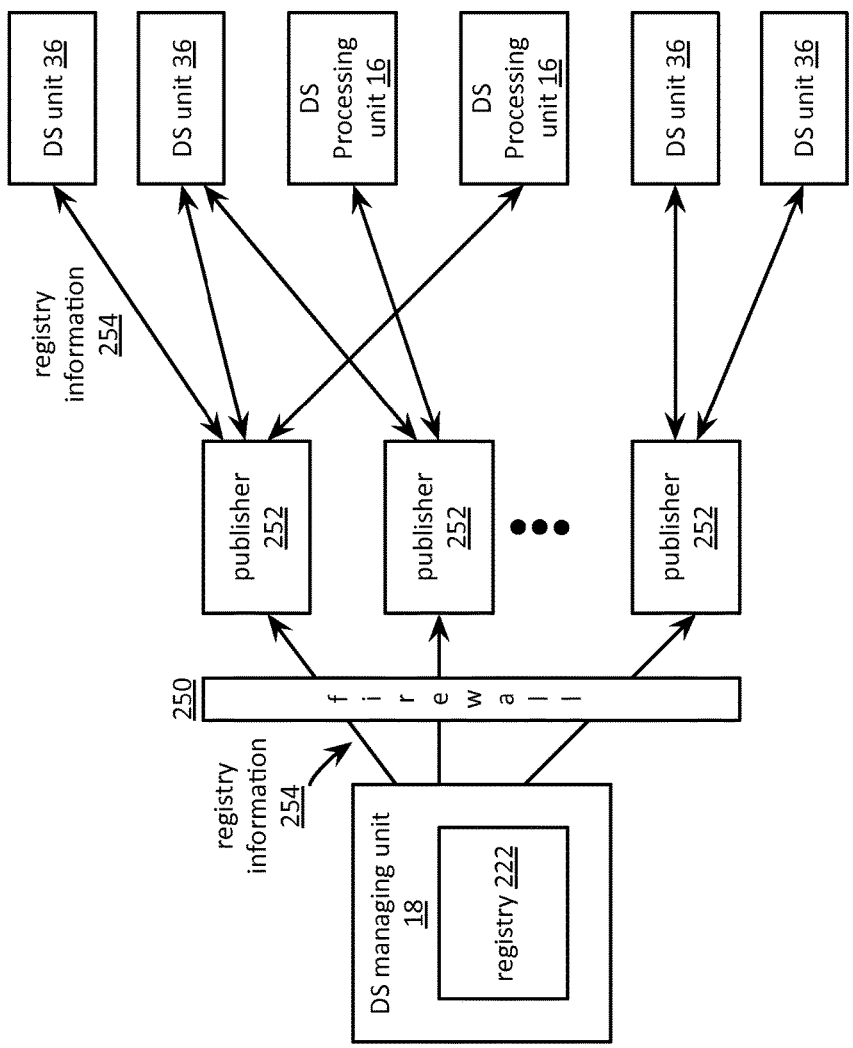
FIG. 14 is a schematic block diagram of an embodiment of a registry distribution system in accordance with invention.
Figure 15:
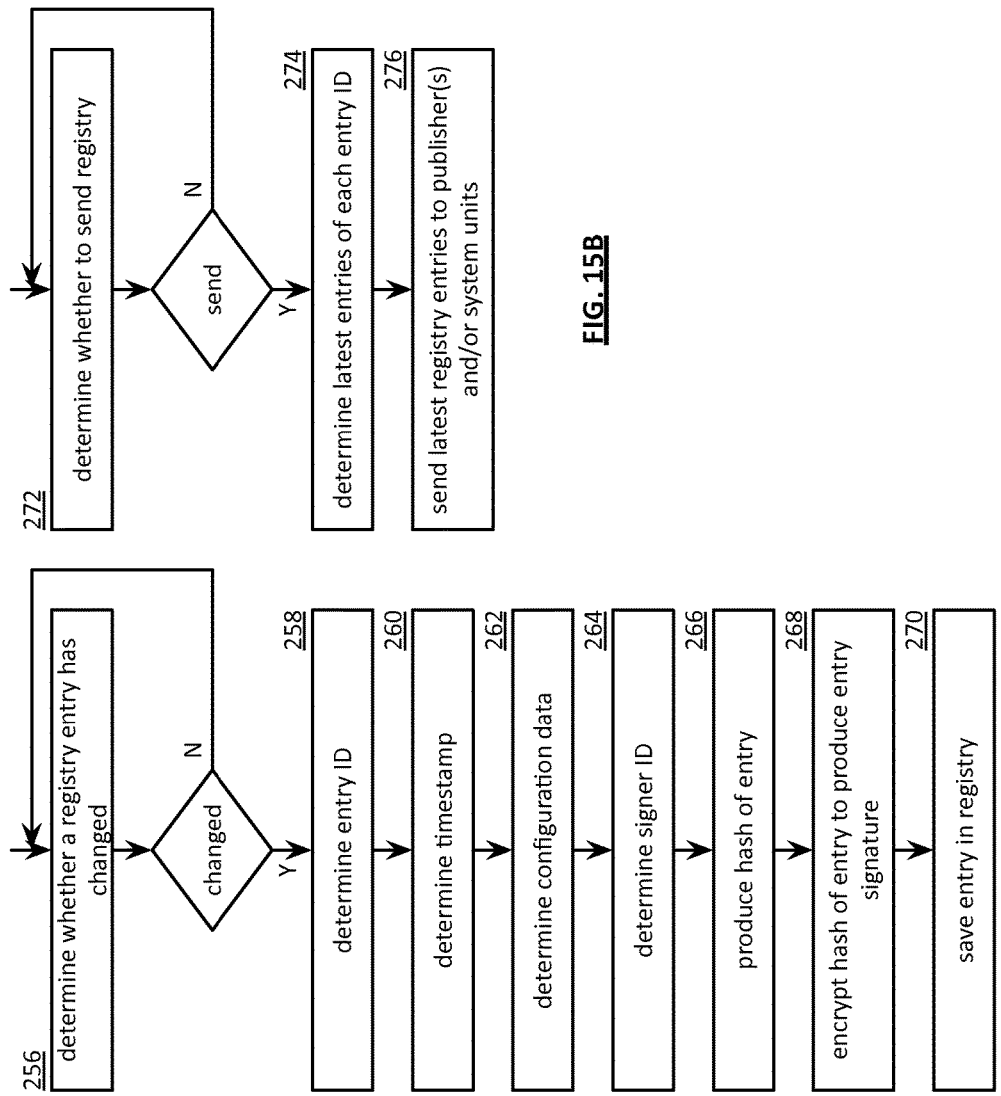
FIG. 15A is a flowchart illustrating an example of updating a registry entry in accordance with the invention.
FIG. 15B is a flowchart illustrating an example of distributing registry information in accordance with the invention.

FIG. 14 is a schematic block diagram of an embodiment of a registry distribution system. Such a system includes a dispersed storage (DS) managing unit 18, a firewall 250, a plurality of publishers 252, and a plurality of system units (e.g., DS units 36, DS processing units 16, the storage integrity processing unit 20, user devices 12-14, DS managing units 18). Alternatively, the DS managing unit 18 is operably coupled to the plurality of publishers 252 via a private network without the use of the firewall 250. Such a firewall provides intrusion protection such that registry information 254 is sent in a one-way direction from the DS managing unit 18 to the publisher 252 minimizing any ability by an external entity to tamper with the registry information 254.

The DS managing unit 18 includes a registry 222 and sends registry information 254 from the registry 222 to the plurality of publishers 252 from time to time. Each of the publishers 252 includes a processing module and memory and may be located at a geographically different site than the other system units. The publishers 252 are operably coupled to the units of a dispersed storage network (DSN) via an internet connection and/or a private network.

The publisher 252 receives the registry information 254 from the DS managing unit 18 from time to time. The publisher 252 sends the registry information 254 to one or more units of the DSN from time to time. For example, the publisher 252 pushes registry information 254 to a DS unit once per day. As another example, the publisher 252 pushes the registry information 254 to a DS unit when there is a change in the registry information 254. As yet another example, the publisher 252 sends the registry information 254 to a DS unit when the DS unit requests the registry information 254. Methods to update and distribute registry information are described in greater detail with reference to FIGS. 15A, 15B, and 16.

FIG. 15A is a flowchart illustrating an example of updating a registry entry. The method begins with step 256 where a processing module determines whether a registry entry has changed. Such a determination may be based on one or more of a new input from a user of a dispersed storage (DS) managing unit, a DS managing unit message, addition of a new software application, and addition of new system configuration parameters. The method repeats back to step 256 when the processing module determines that the registry entry has not changed. The method continues to step 258 when the processing module determines that the registry entry has changed.

The method continues at step 258 where the processing module determines an entry identifier (ID). The entry ID includes one of a reuse of a current entry number with similar entry information and a newly assigned entry ID. Such a determination may be based on at least one of reception of new information requiring a new entry ID and reception of information to modify an existing entry ID. The method continues at step 260 where the processing module determines a timestamp based on a current system clock. The method continues at step 262 where the processing module determines configuration data. Such a determination is based on one or more of information from a new input, a lookup, and analysis, a command, and a message.

The method continues at step 264 where the processing module determines a signer ID based on one or more of an ID of a present unit, a predetermination, a command, and a message. The processing module forms a registry entry that includes the entry ID, the timestamp, the configuration data, and the signer ID. The method continues at step 266 where the processing module calculates a hash of the registry entry to produce a hash of the entry. For example the processing module utilizes a MD5 hash to produce the hash of the entry. The method continues at step 268 where the processing module encrypts the hash of the entry to produce an entry signature utilizing a private key of a private/public key pair associated with a present unit (e.g., DS managing unit). The method continues at step 270 where the processing module saves the registry entry and the entry signature in the registry for subsequent distribution.

FIG. 15B is a flowchart illustrating an example of distributing registry information. The method begins with step 272 where a processing module determines whether to send registry information. Such a determination may be based on one or more of a time period has elapsed since a last time that the registry information was sent, a change is detected in the registry, and a registry information request message was received. The method loops at step 272 to determine whether to send registry information when the processing module determines not to send the registry information. The method continues to step 274 when the processing module determines to send the registry information.

The method continues at step 274 where the processing module determining latest entries of each entry identifier (ID). As such, the processing module determines a most recent registry entry when or more registry entries share a same entry ID based on comparing timestamps. The method continues at step 276 where the processing module sends the latest registry entries to a plurality of publishers and/or directly to system units. The method of operation of a system unit receiving the latest registry entries is described with reference to FIG. 16.

Figure 16:
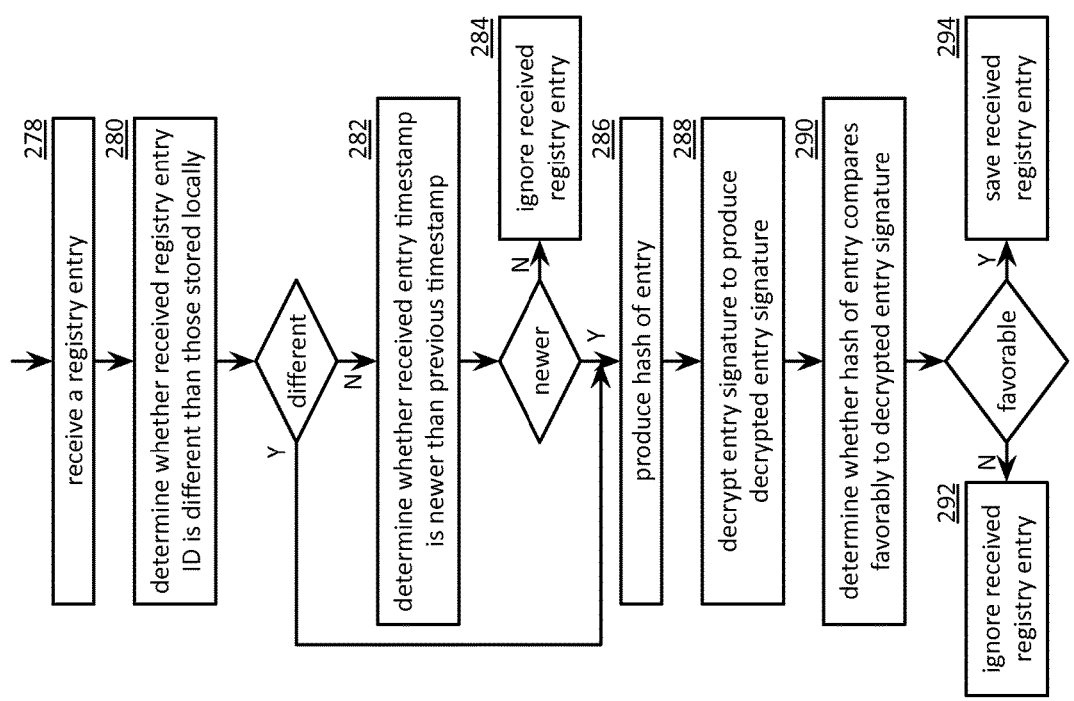
FIG. 16 is a flowchart illustrating an example of processing registry information in accordance with the invention.

FIG. 16 is a flowchart illustrating an example of processing registry information. The method begins with step 278 where a processing module receives a registry entry. The receiving includes the processing module receiving the registry entry as a push message and receiving the registry entry in response to a request from the processing module. The registry entry may be one registry entry of a plurality of registry entries included in a portion of a registry.

The method continues at step 280 where the processing module determines whether the received registry entry includes an entry identifier (ID) that is substantially different than a registry entry stored locally (e.g., previously received). The method branches to step 286 when the processing module determines that the registry entry ID is different than those stored locally. The method continues to step 282 when the processing module determines that the registry entry ID is the same as at least one registry entry stored locally. The method continues at step 282 where the processing module determines whether a received registry entry timestamp is newer than a timestamp of all previous registry entries with a same entry ID. Such a determination is based on a comparison of a timestamp of the received registry entry to a timestamp of each previously received registry entry, when the entry ID of the received registry entry is substantially the same as a entry ID of each previously received registry entry.

The method branches to step 286 when the processing module determines that the received entry timestamp is newer than the previous timestamp. The method continues to step 284 when the processing module determines that the received entry timestamp is not newer than the previous timestamp. The method continues at step 284 where the processing module ignores (e.g., deletes without storing) the received registry entry when the processing module determines that received registry entry timestamp is not newer than at least one previous registry entry of the same entry ID.

The method continues at step 286 where the processing module calculates a hash of the received registry entry to produce a hash of the entry. For example, the processing module utilizes a MD5 hash algorithm to produce the hash of the entry. The method continues at step 288 where the processing module decrypts the entry signature of the registry entry to produce a decrypted entry signature utilizing a public key associated with a signer of the registry entry. For example, the processing module utilizes a public key associated with a DS managing unit ID when a signer ID is the same as a DS managing unit ID.

The method continues at step 290 where the processing module determines whether the hash of the registry entry compares favorably to the decrypted entry signature to determine if the registry entry is valid. The processing module determines that the comparison is favorable when the hash of the registry entry is substantially the same as the decrypted entry signature. The method branches to step 294 when the processing module determines that the hash of the entry compares favorably to the decrypted entry signature (e.g., valid signature). The method continues to step 292 when the processing module determines that the hash of the entry does not compare favorably to the decrypted entry signature. The method continues at step 292 where the processing module ignores the received registry entry.

The method continues at step 294 where the processing module saves the received registry entry as a validated received registry entry. For example, the processing module stores the received registry entry in a local memory. In addition, the processing module may update a timestamp field of the registry entry utilizing a current clock time and may utilize configuration data included in the registry entry.

Figure 17B:
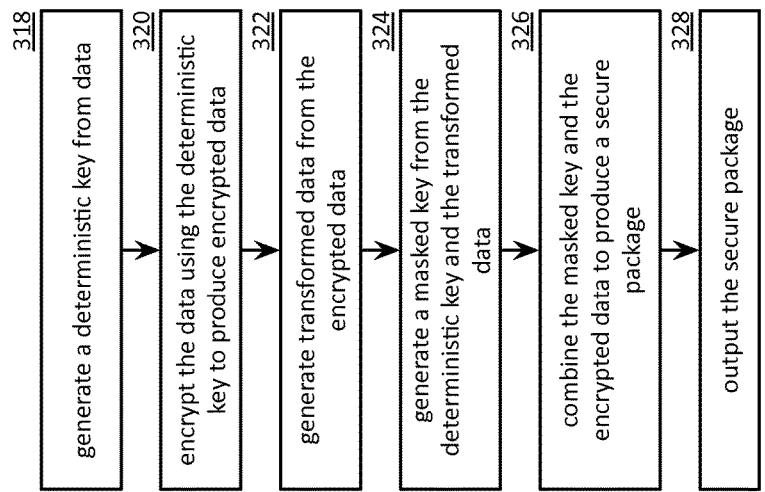
FIG. 17B is a flowchart illustrating an example of encoding data in to produce a secure package in accordance with the invention.
Figure 17A:
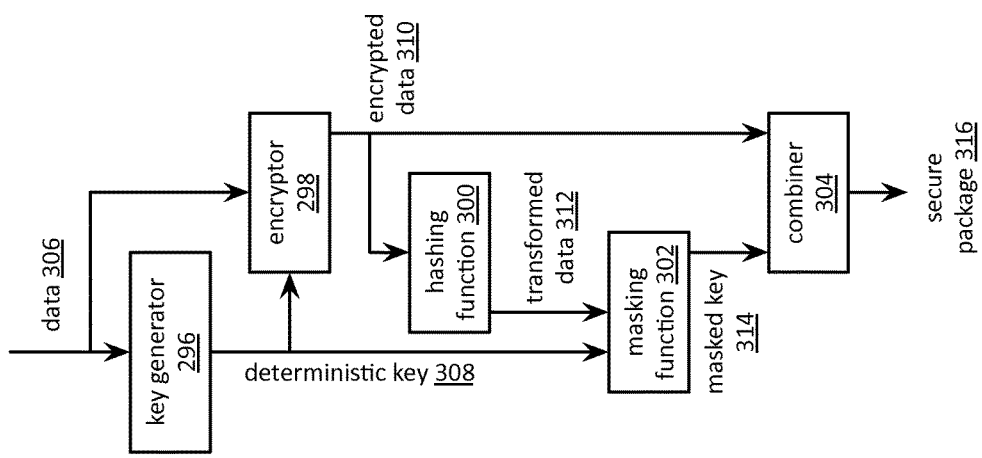
FIG. 17A is a schematic block diagram of an embodiment of a deterministic all or nothing transform (AONT) encoder in accordance with invention.

FIG. 17A is a schematic block diagram of an embodiment of a deterministic all or nothing transform (AONT) encoder. The deterministic AONT encoder includes a key generator 296, an encryptor 298, a hashing function 300, a masking function 302, and a combiner 304 to transform data 306 (e.g., a data segment) into a secure package 316. The key generator 296 generates a deterministic key 308 from the data 306. The generation of the deterministic key 308 includes performing a function on the data 306 to produce the deterministic key 308, wherein the function includes one or more of a hashing function (e.g., message digest (MD)-5, secure hash algorithm (SHA)-1, SHA-256, SHA 512), a checksum function, a hash-based message authentication code (HMAC) (e.g., HMAC-MD-5), a mask generating function (MGF), and a compression function. Such a MGF produces a deterministic pattern of bits of any desired length based on an input. The encryptor 298 encrypts the data 306 using the deterministic key 308 to produce encrypted data 310. The hashing function 300 generates transformed data 312 from the encrypted data 310. The generation of the transformed data includes performing a function on the encrypted data 310 to produce the transformed data 312, wherein the function includes one or more of a hashing function, a checksum function (e.g., a cyclic redundancy check), a hash-based message authentication code (HMAC), a mask generating function (MGF), and a compression function (e.g., repeated applications of a bitwise exclusive OR).

The masking function 302 generates a masked key 314 from the deterministic key 308 and the transformed data 312. The generation of the masked key 314 includes at least one of exclusive ORing (XOR) the deterministic key 308 and the transformed data 312, adding the deterministic key 308 and a modulo conversion of the transformed data 312 (e.g., masked key=(deterministic key)+(transformed data) modulo C; where C=2^(masked key length in bits)), and modifying the deterministic key 308 to produce a modified key and exclusive ORing the modified key and the transformed data 312. The modifying of the deterministic key 308 to produce the modified key includes at least one of adding a predetermined offset to the deterministic key 308, subtracting the predetermined offset from the deterministic key 308, encrypting the deterministic key 308 utilizing a secret key, exclusive ORing the deterministic key 308 and the secret key, and appending the secret key to the deterministic key 308. The combiner 304 combines the encrypted data 310 and the masked key 314 to produce the secure package 316. The combining includes at least one of interleaving, appending, and encoding. For example, the masked key 314 is appended to the encrypted data 310 to produce the secure package 316.

In an example of operation, the key generator 296 receives the data 306, wherein the data 306 is a data segment produced by an access module 80. The key generator 296 calculates the hash of the data 306 to produce the deterministic key 308. The key generator 296 may truncate a hash value to fit a desired key length of the deterministic key 308. Next, the encryptor 298 encrypts the data 306 utilizing the deterministic key 308 to produce encrypted data 310. The hashing function 300 calculates a MD-5 hash of the encrypted data 310 to produce the transformed data 312. The masking function 302 exclusive ORs the deterministic key 308 with the transformed data 312 to produce a masked key 314. The combiner 304 appends the masked key 314 to the encrypted data 310 to produce a secure package 316.

FIG. 17B is a flowchart illustrating an example of encoding data in to produce a secure package. The method begins with step 318 where a processing module generates a deterministic key from data. The method continues at step 320 where the processing module encrypts the data using the deterministic key to produce encrypted data. The method continues at step 322 where the processing module generates transformed data from the encrypted data. The method continues at step 324 generates a masked key from the deterministic key and the transformed data. The method continues at step 326 where the processing module combines the masked key and the encrypted data to produce a secure package. The method continues at step 328 where the processing module outputs the secure package.

The outputting includes at least one of sending the secure package to a wireless communication device for wireless communication of the secure packet, dispersed storage error encoding the secure package to produce a plurality of encoded data slices and outputting the plurality of encoded data slices to a dispersed storage network (DSN) memory for storage therein, and receiving a second secure package from a dispersed storage network (DSN) memory and facilitating storage of the secure package in the DSN memory when the secure package compares favorably to the second secure package. The receiving of the second secure package includes one or more of retrieving a plurality of encoded second secure package slices and dispersed storage error decoding the plurality of encoded second secure package slices to produce the second secure package.

Facilitating the storage of the secure package in the DSN memory when the secure package compares favorably to the second secure package includes comparing at least a portion of the secure package to at least a corresponding portion of the second secure package and dispersed storage error encoding the secure package to produce a plurality of sets of encoded data slices and sending the plurality of sets of encoded data slices to the DSN memory for storage therein when the comparison is substantially same. The comparing includes indicating that at least the portion of the second secure package compares favorably to at least the portion of the secure package when encrypted data of the second secure package is substantially not the same as the encrypted data and indicating that at least the portion of the second secure package compares favorably to at least the portion of the secure package when a masked key of the second secure package is substantially not the same as the masked key.

FIG. 18A is a schematic block diagram of an embodiment of a deterministic all or nothing transform (AONT) decoder. A deterministic AONT decoder includes a splitter 330, a hashing function 300, a de-masking function 332, and a decryptor 334 to transform a secure package 316 into data 306. A splitter 330 extracts a masked key 314 and encrypted data 310 from the secure package 316. The splitting includes at least one of de-appending, de-interleaving, and decoding. For example, the splitter 330 de-appends the masked key 314 and encrypted data 310 from the secure package 316. The hashing function 300 generates transformed data 312 from the encrypted data 310. The de-masking function 332 generates a deterministic key 308 from the masked key 314 and the transformed data 312. The generating of the deterministic key 308 includes at least one of exclusive ORing (XOR) the masked key 314 and the transformed data 312, subtracting a modulo conversion of the transformed data 312 from the masked key 314 (e.g., deterministic key=(masked key)−(transformed data) modulo C; where C=2^(masked key length in bits), and adding C if the result is <zero), and exclusive ORing the transformed data 312 and the masked key 314 to produce a modified key and modifying the modified key to produce the deterministic key 308. The modifying the modified key to produce the deterministic key 308 includes at least one of adding a predetermined offset to the modified key, subtracting the predetermined offset from the modified key, encrypting the modified key utilizing a secret key, exclusive ORing the modified key and the secret key, and appending the secret key to the modified key. Such a decryptor 334 decrypts the encrypted data 310 based on the deterministic key 308 to produce data 306.

In an example of operation, the splitter 330 receives a secure package (e.g., an encrypted data segment produced from retrieved encoded data slices by a grid module) and extracts a masked key and the encrypted data. The hashing function 300 calculates a message digest (MD)-5 hash of the encrypted data 310 to generate transformed data 312. The de-masking function 332 calculates a XOR of the masked key 314 and the transformed data 312 to generate a deterministic key 308. The decryptor 334 decrypts the encrypted data 310 based on the deterministic key 308 to produce data 306. The data 306 may include a data segment that is subsequently aggregated with other data segments to produce a data object as part of a retrieval sequence.

FIG. 18B is a flowchart illustrating an example of decoding a secure package to produce data, which include similar steps to FIG. 17B. The method begins with step 336 where a processing module retrieves a secure package. The retrieving includes at least one of receiving the secure package and retrieving at least a decode threshold number of encoded data slices of a set of encoded data slices from a dispersed storage network (DSN) memory and dispersed storage error decoding the at least the decode threshold number of encoded data slices to produce the secure package. The method continues at step 338 where the processing module extracts a masked key and encrypted data from the secure package. The method continues at step 322 of FIG. 17B where the processing module generates transformed data from the encrypted data.

The method continues at step 342 where the processing module generates a deterministic key from the masked key and the transformed data. The method continues at step 344 where the processing module decrypts the encrypted data based on the deterministic key to produce data. The method continues at step 346 where the processing module transforms the data into a validation key utilizing a hashing function. A transformation includes performing a function on the data to produce the validation key, wherein the function includes one or more of a hashing function (e.g., message digest (MD)-5, secure hash algorithm (SHA)-1, SHA-256, SHA 512), a checksum function, a hash-based message authentication code (HMAC) (e.g., HMAC-MD-5), a mask generating function (MGF), and a compression function. The method continues at step 348 where the processing module indicates that the data is valid when the validation key compares favorably (e.g., substantially the same) to the deterministic key.

Figure 19:
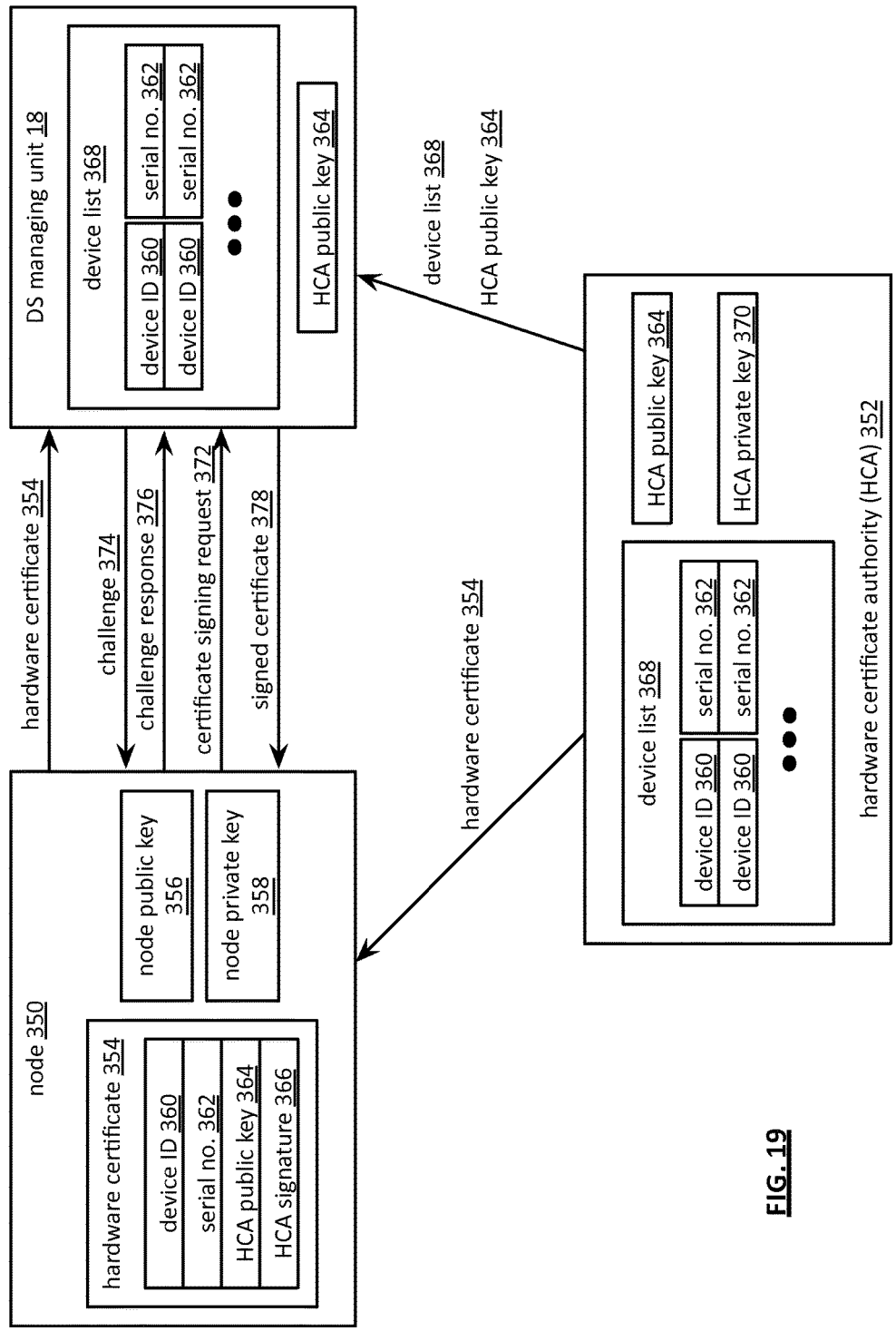
FIG. 19 is a schematic block diagram of an embodiment of a hardware authentication system in accordance with the invention.

FIG. 19 is a schematic block diagram of an embodiment of a hardware authentication system. The authentication system may include a node 350 to authenticate, a dispersed storage (DS) managing unit 18, and a hardware certificate authority (HCA) 352. The node may include one or more of a computing core 26, a unit, a user device 12-14, a DS unit 36, a DS processing unit 16, a storage integrity processing unit 20, and another DS managing unit 18.

The node 350 includes storage of a hardware certificate 354, a node public key 356, and a node private key 358. The hardware certificate 354 includes a device identifier (ID) 360, a serial number 362, a HCA public key 364, a HCA private key 366. The device ID 360 provides a unique virtual identifier for hardware associated with node 350 (e.g., may not be permanently assigned to the hardware). The serial number 362 indicates a unique permanent value associated with the hardware (e.g., determined at the time of manufacture). The HCA public key 364 and a HCA private key 366 are included in a public/private key pair associated with the HCA 352. The node public key 356 and a node private key 358 are included in a public/private key pair. For example, node 350 generates the node public key 356 and the node private key 358 as a public/private key pair associated with node 350.

The HCA 352 includes storage of a device list 368, the HCA public key 364, and a HCA private key 370. The device list 368 includes one or more device IDs 360 and one or more paired device serial numbers 362 associated with one or more nodes 350. The device list 368 may be received by the HCA 352 as one or more of a user input, a pre-programming, an assembly-line output, a manufacturing computer output, a command, and a message. The HCA 352 sends the device list 368 to the DS managing unit 18 from time to time or in response to a device list request from the DS managing unit 18. The HCA 352 sends the HCA public key 364 to the DS managing unit 18 from time to time, in response to a request, and/or upon a reboot of the DS managing unit 18.

The HCA 352 may produce a hardware certificate 354, wherein the hardware certificate 354 includes a device ID 360 and a paired serial number 362, the HCA public key 364, and a HCA signature 366. The HCA signature 366 may be produced by the HCA 352 by calculating a hash of the hardware certificate 354 (e.g., without the HCA signature 366) and encrypting the hash utilizing the HCA private key 370. The HCA 352 sends the hardware certificate 354 to the node 350. For example, the HCA 352 sends hardware certificate 354 to the node 350 at a time of manufacture of the node 350. As another example, the HCA 352 sends the hardware certificate 354 to the node via a network when the node 350 is installed. The node 350 receives the hardware certificate 354 from the HCA 352 and stores the hardware certificate in a local memory of the node 350. Alternatively, the node 350 may validate the hardware certificate 354 prior to storing the hardware certificate 354 in the local memory. The validation includes comparing a calculated hash of the hardware certificate 354 to a decrypted HCA signature utilizing the HCA public key 364 of the hardware certificate 354. The node 350 validates that the hardware certificate 354 when the comparison indicates that they are substantially the same.

The DS managing unit 18 includes storage of the device list 368 and the HCA public key 364. The DS managing unit 18 receives the device list 368 from the HCA 352 and stores the device list 368 in local memory of the DS managing unit 18. Alternatively, the DS managing unit 18 may receive the device list 368 as a user input or from any other unit of a dispersed storage network (DSN) computing system. The DS managing unit 18 receives the HCA public key 364 from the HCA 352 and stores the HCA public key 364 in the local memory of the DS managing unit 18. Alternatively, the DS managing unit 18 receives the HCA public key 364 from any node 350 in a registration sequence.

In an example of operation, the node 350 sends the hardware certificate 354 to the DS managing unit 18 when the node 350 desires to authenticate the hardware and join the DSN computing system. The DS managing unit 18 validates the hardware certificate 354 (e.g., validates the HCA signature 366) and compares the device ID 360 and/or serial number 362 contained in the hardware certificate 354 to device IDs 360 in the locally stored device list 368 when the hardware certificate 354 is valid. The DS managing unit 18 validates the hardware when the DS managing unit 18 finds a matching device ID 360 and/or serial number 362 of the hardware certificate 354 in the device list 368. Next, the DS managing unit 18 sends a challenge message 374 to the node 350 and receives a challenge response 376 from the node 350. A challenge may include a message that is encrypted utilizing the node public key 356. The node 350 decrypts the encrypted message of the challenge 374 utilizing the node private key 358 to reproduce the message and sends the challenge response 376 to the DS managing unit 18, wherein the challenge response 376 includes a message. The node 350 sends a certificate signing request 372 to the DS managing unit 18 and receives a signed certificate 378 from the DS managing unit 18 enabling the node to communicate with other units and nodes of the DSN computing system. The method of operation of the node 350 and DS managing unit 18 are discussed in greater detail with reference to FIGS. 20A and 20B.

Figures 20A, 20B:
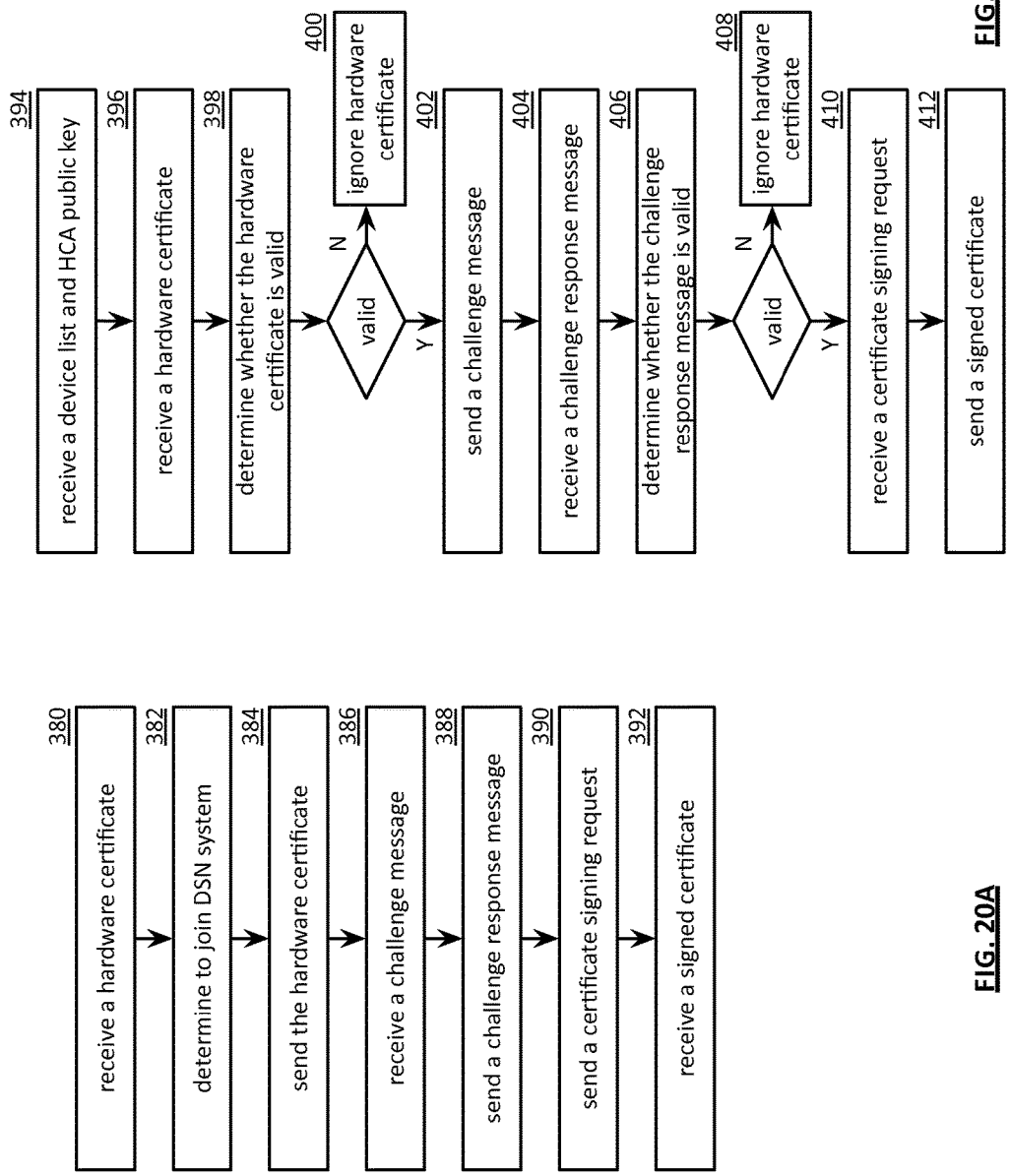
FIG. 20A is a flowchart illustrating an example of acquiring a signed certificate in accordance with the invention.
FIG. 20B is a flowchart illustrating an example of verifying a certificate signing request (CSR) in accordance with the invention.

FIG. 20A is a flowchart illustrating an example of acquiring a signed certificate. The method begins with step 380 where a processing module (e.g., of a system node) receives a hardware certificate. The processing module may receive the hardware certificate from one or more of a hardware certificate authority (HCA), a dispersed storage (DS) managing unit, and any other element or unit of a dispersed storage network (DSN) computing system. For example, the processing module receives the hardware certificate from the HCA at a time of manufacture of the hardware when the processing module is functioning. The processing module saves the hardware certificate in a local memory and may validate the hardware certificate by calculating a hash of the hardware certificate and comparing the hash to a decrypted signature where a HCA signature is decrypted utilizing a HCA public key.

The method continues with step 382 where the processing module determines to join a DSN system. Such a determination may be based on one or more of a predetermination, a boot up programming, a configuration file, a user input, a message, and a command. The method continues at step 384 where the processing module sends the hardware certificate to a DS managing unit. Alternatively, the processing module encrypts the hardware certificate utilizing a node private key associated with the processing module prior to sending the hardware certificate to the DS managing unit.

The method continues at step 386 where the processing module receives a challenge message from the DS managing unit. A challenge may include instructions such as that the processing module is to decrypt a portion of the challenge message or to encrypt a response utilizing a private key of the node associated with the processing module. For example, the processing module receives a challenge message and decrypts a portion of the challenge message utilizing the node private key. The processing module forms a challenge response message utilizing the encrypted portion of the challenge message. As another example, the processing module encrypts a portion of the received challenge message utilizing the node private key to form the challenge response message. The method continues at step 388 where the processing module sends the challenge response message to the DS managing unit.

The method continues at step 390 where the processing module sends a certificate signing request (CSR) to the DS managing unit. The CSR includes one or more of a device identifier (ID), a serial number of a node associated with the processing module, the node public key, registration information, and a signature. The method continues at step 392 where the processing module receives a signed certificate from the DS managing unit. The signed certificate includes a signature from the DS managing unit. The processing module subsequently utilizes the signed certificate to authenticate and communicate with other nodes of the system.

FIG. 20B is a flowchart illustrating an example of verifying a certificate signing request (CSR). The method begins with step 394 where a processing module (e.g., a dispersed storage (DS) managing unit) receives a device list and a hardware certificate authority (HCA) public key. The receiving includes at least one of receiving the device list and the HCA public key from an HCA, as a user input, as a command, and as a message. The method continues at step 396 where the processing module receives a hardware certificate from a node requesting to authenticate hardware and join a dispersed storage network (DSN) computing system. For example, the processing module receives the hardware certificate from a DS unit during an initial installation.

The method continues at step 398 where the processing module determines whether the hardware certificate is valid by validating a signature and validating a hardware device identifier (ID) and serial number. The processing module validates the signature went a comparison of a hash of the hardware certificate to a decrypted HCA signature utilizing the HCA public key indicates that they are substantially the same. The processing module validates that the hardware device ID and/or serial number are listed in the device list to validate the hardware ID and serial number. The method branches to step 402 when the processing module determines that the hardware certificate is valid. The method continues to step 400 when the processing module determines that the hardware certificate is not valid. The method continues at step 400 where the processing module ignores the hardware certificate in the method ends.

The method continues at step 402 where the processing module sends a challenge message to the node requesting hardware authentication. A challenge message may include instructions to decrypt a portion of the message that is encrypted utilizing the node public key or to encrypt a portion of a response message utilizing a private key of the node. The method continues at step 404 where the processing module receives a challenge response message from the node. The method continues at step 406 where the processing module determines whether the challenge response message is valid by either validating that the response includes a decrypted version of a portion of the challenge message or that the response may be decrypted utilizing the node public key to reveal a match to a portion of the challenge message. The method branches to step 410 when the processing module determines that the challenge response message is valid. The method continues to step 408 when the processing module determines that the challenge response message is not valid. The method continues at step 408 where the processing module ignores the hardware certificate and the method ends.

The method continues at step 410 where the processing module receives a certificate signing request (CSR) from the node. The method continues at step 412 where the processing module generates a signed certificate and sends the signed certificate to the node. For example, the processing module signs the certificate of the CSR by encrypting a portion of the signed certificate utilizing a private key associated with the processing module (e.g., of the DS managing unit) and including a public key associated with the processing module (e.g., of the DS managing unit) such that any node may subsequently validate the signed certificate.

Figure 21:
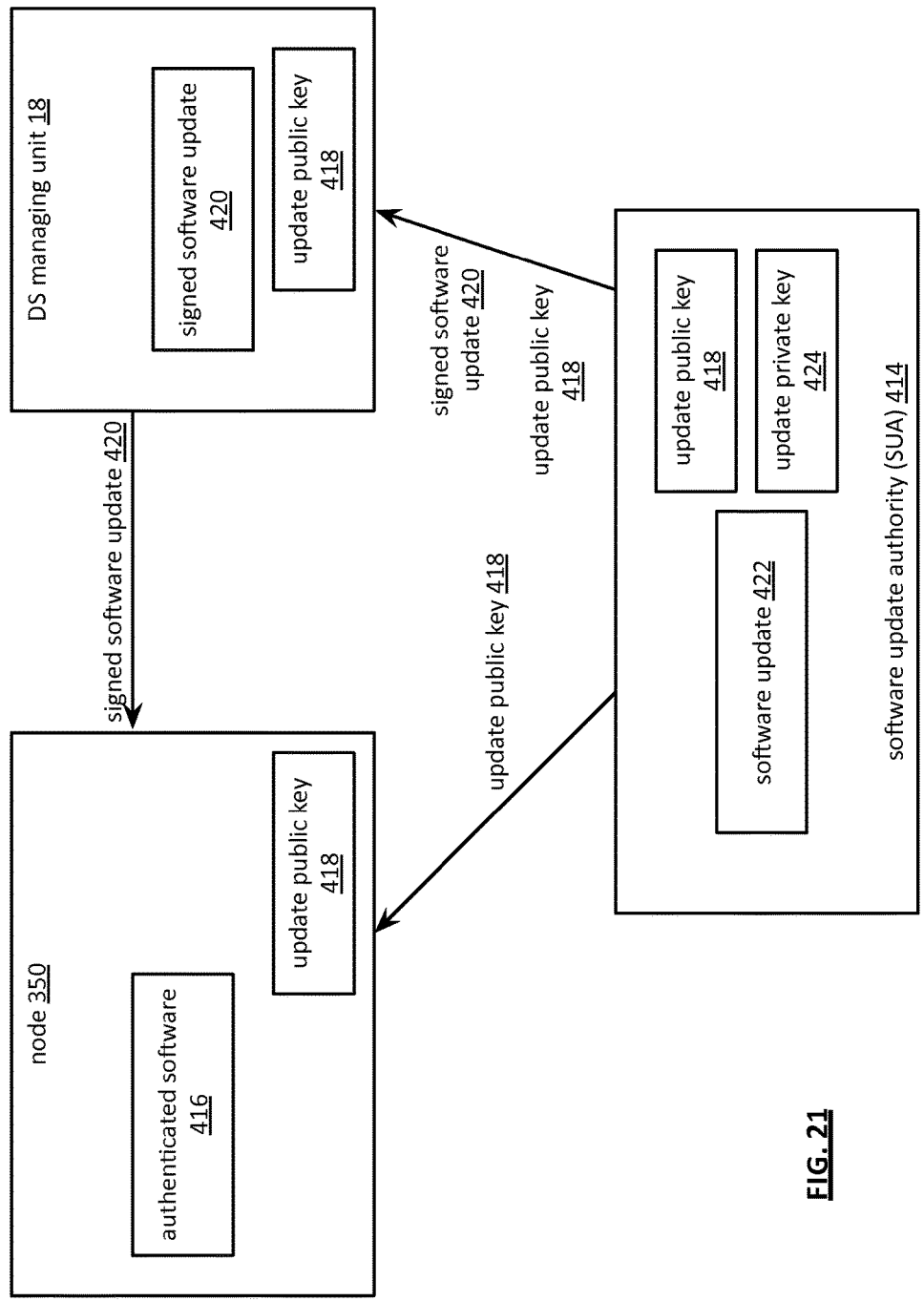
FIG. 21 is a schematic block diagram of an embodiment of a software update authentication system in accordance with the invention.
Figure 22:
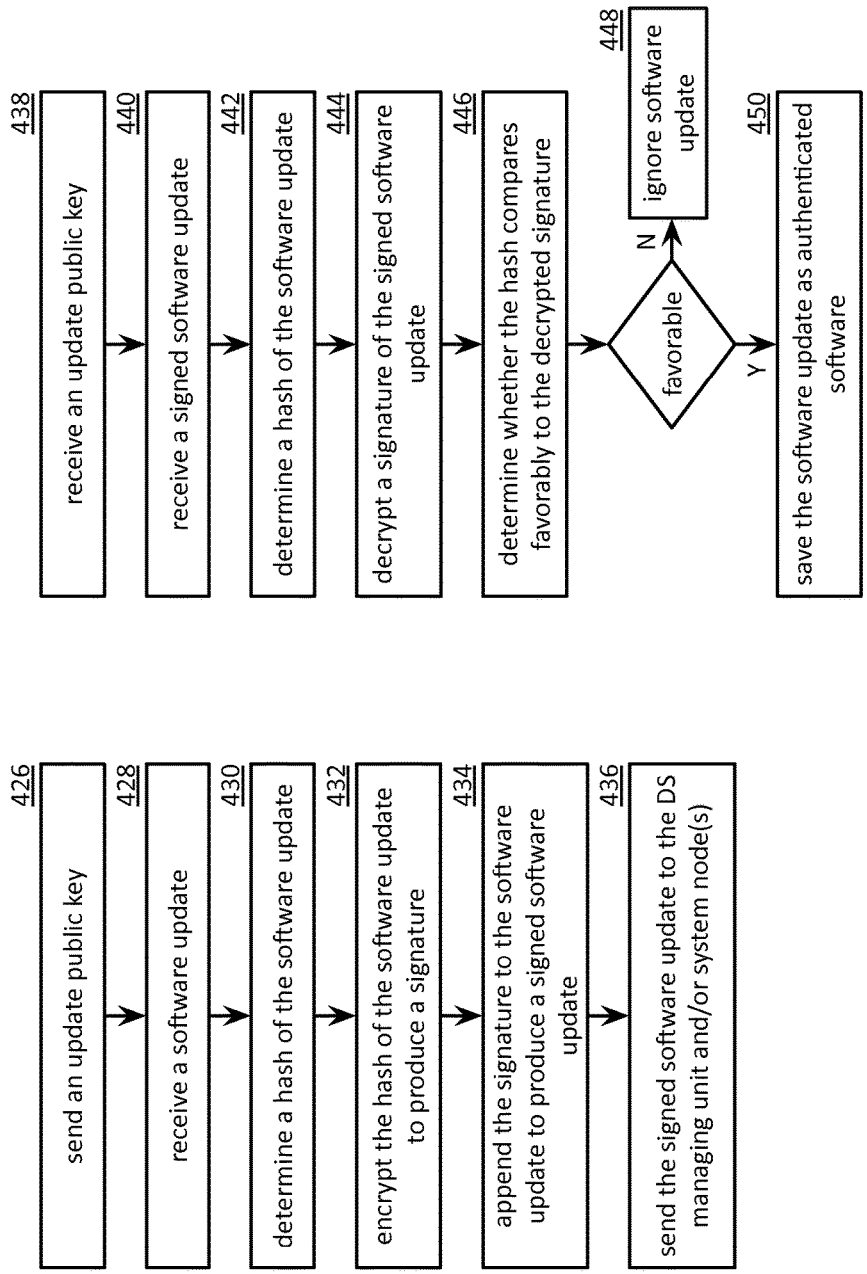
FIG. 22A is a flowchart illustrating an example of generating a signed software update in accordance with the invention.
FIG. 22B is a flowchart illustrating an example of authenticating a signed software update in accordance with the invention.

FIG. 21 is a schematic block diagram of an embodiment of a software update authentication system. The software may include one or more of executable code, object code, source code, server code, client code, compiler code, debugger code, interpreter code, editor code, an instruction set, graphical interface code, an operating system, information, low-level software, firmware code, diagnostic code, monitoring code, high-level code, an applet, a driver, an application, and a number table. A software update may include software that is a portion of total software of a dispersed storage network (DSN) computing system and/or contain newer software that may be utilized to update a fielded computing device of the DSN computing system.

A software update authentication system includes a node 350, a dispersed storage (DS) managing unit 18, and a software update authority (SUA) 414. The node may include any element, unit, computing core 26 of the DSN system such as any one or more of a user device 12-14, a DS processing unit 16, a DS managing unit 18, a storage integrity processing unit 20, and a DS unit 36. The node 350 includes storage of authenticated software 416 and an update public key 418. The update public key 418 is associated with a public/private key pair of the SUA 414. The DS managing unit 18 includes storage of a signed software update 420 and the update public key 418.

The SUA 414 includes a processing module and memory and may be located at a geographically different site than the other system units. The software update authority 414 includes storage of a software update 422, an update private key 424, and the update public key 418. The SUA 414 sends the update public key 418 to the DS managing unit 18 from time to time, in response to a request, and/or upon a reboot of the DS managing unit 18. The SUA 414 sends the update public key 418 to the node 350 from time to time, in response to a request, and/or upon a reboot of the node 350.

The software update authority 414 receives the software update 422 from any one of a user input, a manufacturing system output, a third-party vendor, an internet source, a file sharing source, from slices stored in a DSN memory, a programming computer output, a physical media device, and any other source of software. The software update authority 414 saves the software update 422 in a local memory. The software update authority 414 produces a signature to produce the signed software update 420. For example, the software update authority 414 encrypts a calculated hash of the software update to produce the signature utilizing the update private key 424. As another example, the software update authority 414 encrypts a calculated hash of a software update message to produce the signature utilizing the update private key 424. The software update authority 414 appends one or more of the signature and the update public key 418 to the software update 422 to produce the signed software update 420. The software update authority 414 sends the signed software update 420 to the DS managing unit 18 for further distribution to one or more nodes 350 of the DSN computing system.

The DS managing unit 18 receives the signed software update 420 from the software update authority 414 and stores the signed software 420 update a local memory of the DS managing unit 18 to facilitate distribution to one or more nodes 350 of the DSN computing system. In addition, the DS managing unit 18 may verify the signed software update 420 prior to saving the signed software update 420 in the local memory. The DS managing unit 18 verifies the signed software update 420 by comparing a hash of a portion of the software update 420 to a decrypted signature utilizing the update public key 418. The DS managing unit 18 determines that the signed software update 420 is favorably verified when the comparison indicates that the hash and the decrypted signature are substantially the same. The DS managing unit 18 sends the locally stored signed software update 420 to one or more system nodes based on one or more of a time period that has elapsed since a previous software update cycle, in response to a request from any node, and in response to a push command from the software update authority 414.

The node 350 receives the signed software update 420 from the DS managing unit 18 and verifies the signed software update 420 by comparing the hash of the portion of the software update to a decrypted signature utilizing the update public key 418. The node 350 determines that the signed software update 420 is verified when the comparison indicates that the hash and the decrypted signature are substantially the same. The node 350 produces the authenticated software 416 from the signed software update 420 when the node 350 determines that the signed software update 320 is verified. The node saves the authenticated software 416 in the local memory of the node 350. In addition, the node utilizes the locally stored authenticated software 416 to perform functions of the node 350 by executing at least a portion of the authenticated software 416 from time to time. The method of operation of the software update authority 414 and the node is discussed in greater detail with reference to FIGS. 22A and 22B.

FIG. 22A is a flowchart illustrating an example of generating a signed software update. The method begins with step 426 where a processing module (e.g., of a software update authority) sends an update public key to one or more nodes and/or dispersed storage DS managing unit(s) of a dispersed storage network (DSN) computing system. Such an update public key is part of a public/private key pair associated with the software update authority and is utilized throughout the DSN computing system to validate communications to and from the software update authority.

The method continues at step 428 where the processing module receives a software update from any one of a user input, a manufacturing system output, a third-party vendor, an internet source, a file sharing source, from slices stored in a DSN memory, a programming computer output, a physical media device, and any other source of software. The processing module saves the software update in local memory. The method continues at step 430 where the processing module determines a hash of the software update. For example, the processing module calculates the hash of the software update utilizing a message digest (MD)-5 hash algorithm. The method continues at step 432 where the processing module encrypts the hash of the software update to produce a signature utilizing an update private key of the public/private key pair associated with the software update authority.

The method continues with step 434 where the processing module appends the signature to the software update to produce a signed software update. The method continues at step 436 where the processing module sends the signed software update to the DS managing unit and/or one or more other system nodes. Additionally, the processing module saves the signed software update in local memory.

FIG. 22B is a flowchart illustrating an example of authenticating a signed software update. The method begins with step 438 where a processing module (e.g., of a system node) receives an update public key from one of a software update authority and a dispersed storage (DS) managing unit. The processing module may receive the update public key from time to time, in response to a query, substantially alone in a message, included with a signed certificate message, and included with a signed software update. For example, the processing module receives the update public key from the software update authority in message at the time of manufacture.

The method continues at step 440 where the processing module receives a signed software update from the DS managing unit from time to time, in response to a query, or as a push message. Alternatively, the processing module receives the signed software update from one of the software update authority, the user device, the DS processing unit, the DS unit, or a publisher.

The method continues at step 442 where the processing module determines a hash of the signed software update. For example, the processing module calculates the hash utilizing a message digest (MD)-5 hash algorithm. The method continues at step 444 where the processing module decrypts a signature of the signed software update utilizing the update public key to produce a decrypted signature. The method continues at step 446 where the processing module determines whether the hash of the signed software update compares favorably to the decrypted signature. The processing module determines that the hash compares favorably to the decrypted signature when the hash and the decrypted signature is substantially the same. The method branches to step 450 when the processing module determines that the hash compares favorably to the decrypted signature. The method continues to step 448 when the processing module determines that the hash compares unfavorably to the decrypted signature. The method continues with step 448 where the processing module ignores the software update and the method ends. The method continues at step 450 where the processing module saves the software update as authenticated software when the processing module determines that the hash compares favorably to the decrypted signature. In addition, the processing module may utilize at least a portion of the authenticated software as the processing module performs functions associated with the processing module.

Alternatively, or in addition to, the processing module receives a public key from a trusted node (e.g., a DS unit) of the DSN computing system. The processing module receives a signed software update from the trusted node and validates that the signed software update was sent from the trusted node by validating the communications message. The processing module validates the signed software update and saves the software update as authenticated software when the processing module determines that the signed software update is valid and that the medications message from the trusted node is valid.

Figure 23:
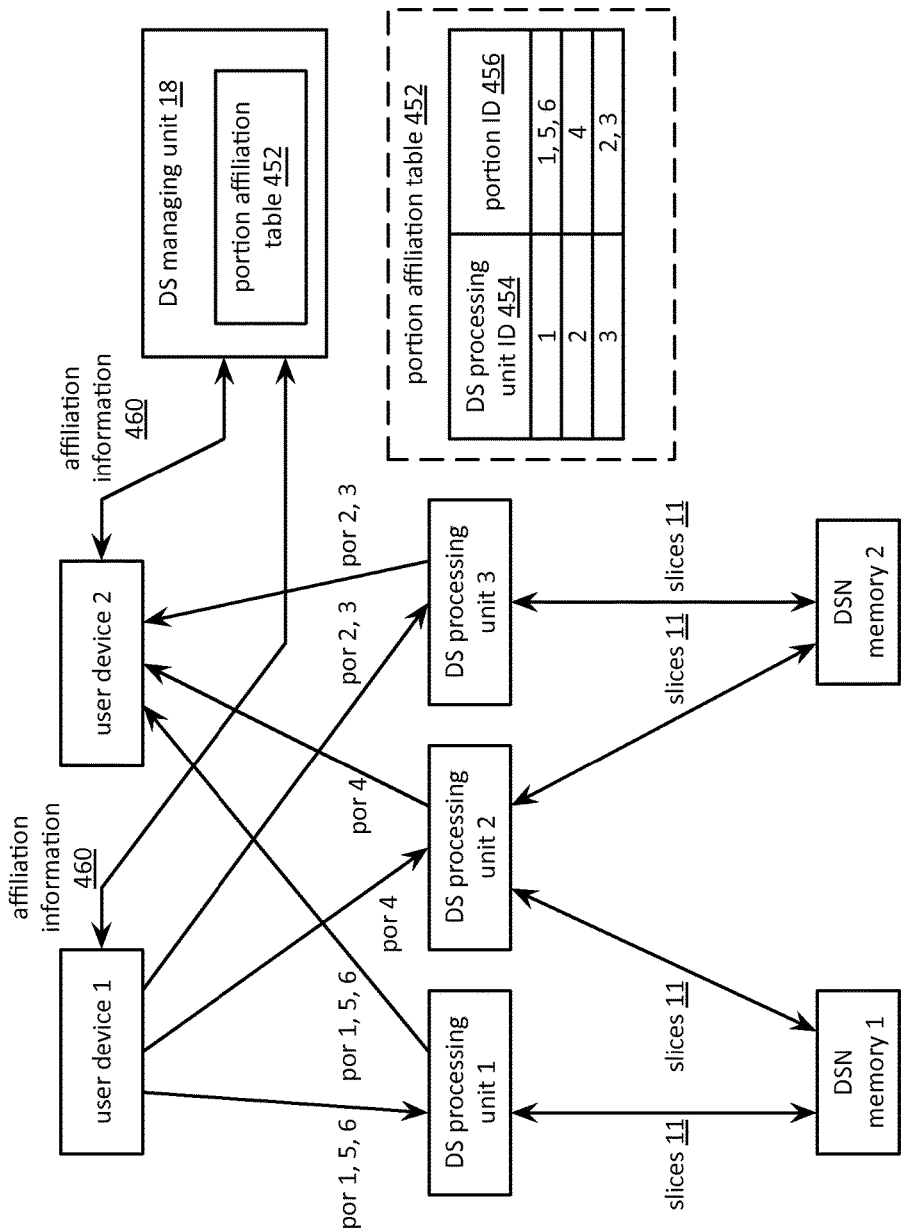
FIG. 23 is a schematic block diagram of an embodiment of a cooperative storage system in accordance with the invention.

FIG. 23 is a schematic block diagram of an embodiment of a cooperative storage system. A system includes one or more user devices 1-2, or more dispersed storage (DS) processing units 1-3, one or more dispersed storage network (DSN) memories 1-2, and a DS managing unit 18. A user device 1-2 stores data as a plurality of portions in at least one DSN memory and retrieve the data portions from the at least one DSN memory utilizing one or more DS processing units 1-3, wherein the DS processing units 1-3 are associated with the plurality of portions of the data. The DS managing unit 18 includes a portion affiliation table 452. The portion affiliation table 452 includes associations between one or more entries of a DS processing unit identifiers field (ID) 454 and a corresponding one or more entries of a portion identifier (ID) field 456. For example, a DS processing unit ID field 454 entry of 3 is associated with portion ID field 456 entries of 2 and 3. As such, DS processing unit 3 is assigned to store and retrieve a second and a third portion of data as slices 11.

In a storage example of operation, user device 1 determines affiliation information including affiliations between DS processing unit IDs and portion IDs. Such a determination may be based on one or more of a storage algorithm user device 1, a predetermination, a vault lookup, and receiving affiliation information 460 from the DS managing unit 18. The user device 1 partitions a data object for storage into six portions in accordance with the affiliation information 460. The user device 1 sends portions 1, 5, and 6 to DS processing unit 1 for storage in accordance with the affiliation information 460. The user device 1 sends the portion 4 to DS processing unit 2 for storage in accordance with the affiliation information 460. The user device 1 sends portions 2 and 3 to DS processing unit 3 for storage in accordance with the affiliation information 460.

The DS processing units 1-4 receives the portions 1-6 and save the portions by at least one of storing the portions locally and dispersed storage error encoding each portion to produce slices 11 and sending the slices 11 to one or more DSN memories for storage therein. For example, DS processing unit 1 dispersed storage error encodes portion 1 to produce portion 1 slices. The method to store data is discussed in greater detail with reference to FIG. 24A.

In a retrieval example of operation, user device 2 determines affiliation information indicating which DS processing unit IDs to retrieve which portions of desired data. Such a determination may be based on one or more of a storage algorithm, a predetermination, a vault lookup, a message from user device 1, and receiving the affiliation information 460 from the DS managing unit. The user device 2 retrieves portions of the data from the DS processing units in accordance with the affiliation information 460. For example, user device 2 retrieves portions 1, 5, and 6 from DS processing unit 1, portion 4 from DS processing unit 2, and portions 2 and 3 from DS processing unit 3. The user device 2 aggregates the portions in sequential order to reproduce the data. The method to retrieve data is discussed in greater detail with reference to FIG. 24B.

In an alternative embodiment, a DS processing of the DS processing units 1-3 is implemented in the user devices 1-2 thus eliminating the need for DS processing units. As such, the user devices 1-2 create portions of the data, create slices of the portions, store the slices in the DSN memory, and update the portion affiliation table 452 in the DS managing unit 18. A retrieving user device determines the affiliation information 460 by querying the DS managing unit, re-creates the portions of the data by retrieving slices from at least one DSN memory, and aggregates the portions to reproduce the data.

Figures 24A, 24B:
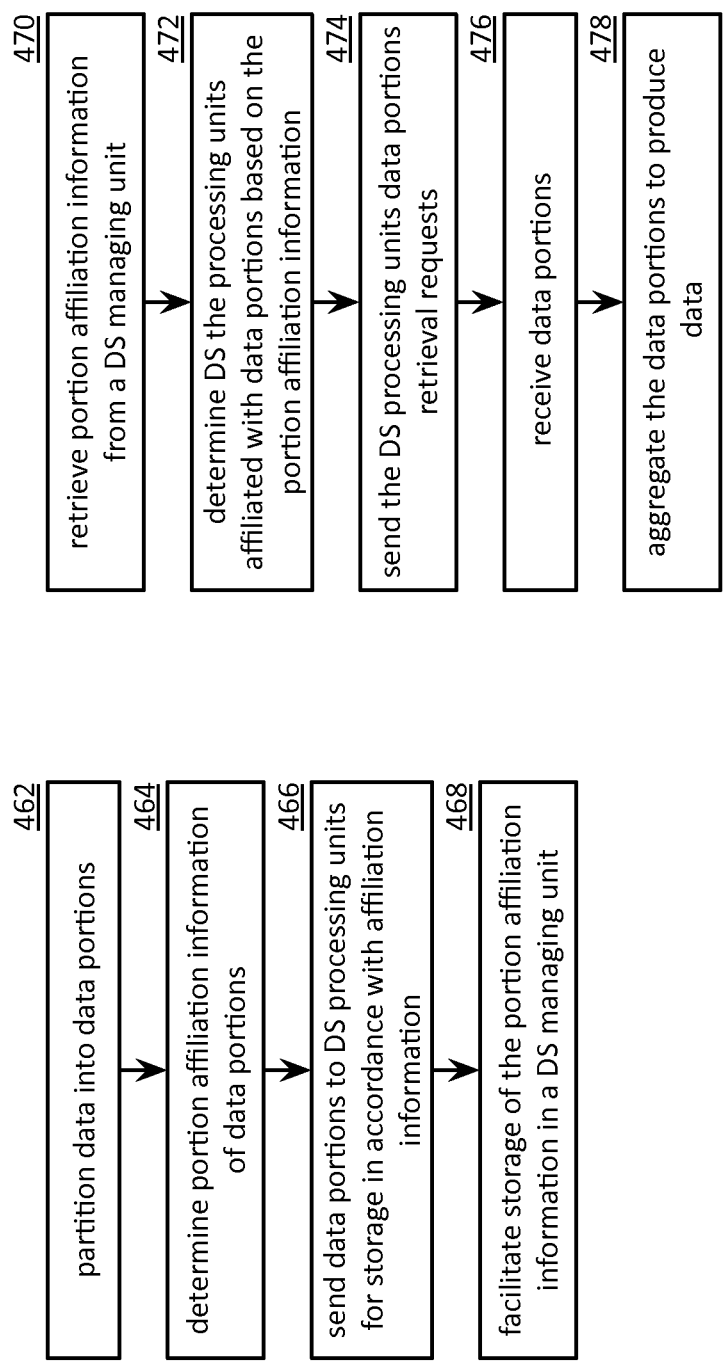
FIG. 24A is a flowchart illustrating an example of storing data in accordance with the invention.
FIG. 24B is a flowchart illustrating an example of retrieving data in accordance with the invention.

FIG. 24A is a flowchart illustrating an example of storing data in accordance with the invention. The method begins with step 462 where a processing module (e.g., of user device) partitions data for storage into two or more data portions. The partitioning may be done by partitioning the data in accordance with one of a predetermined approach or an approach received via a command. For example, the processing module partitions the data into 100 portions in accordance with a predetermined approach from a user device configuration file.

The method continues at step 464 where the processing module determines portion affiliation information of the data portions. For example, the processing module may assign dispersed storage (DS) units in accordance with at least one of a predetermination, a command, a message, a lookup, and received portion affiliation information in response to a query of a DS managing unit. A query includes sending a portion affiliation information assignment request to the DS managing unit. The processing module receives the portion affiliation information from the DS managing unit including affiliations of DS processing units and portion identifiers of the data.

The method continues at step 466 where the processing module sends the data portions to affiliated DS processing units for storage in accordance with the portion affiliation information. The DS processing unit receives the data portion. The DS processing unit determines a cooperative storage method based on one or more of a lookup, a predetermination, a query, a command, and a message. For example, the DS processing unit determines the cooperative storage method based on a query to the DS managing unit. The cooperative storage method may include guidance on how to process the data portion prior to storing the data portion. For example, the guidance may indicate to store the data portion as a data portion in local memory. As another example, the guidance may indicate to create data slices directly from the data portion and store the data slices in one or more dispersed storage network (DSN) memories. As yet another example, the guidance may indicate to create two or more data segments from the data portion and create data slices from each data segment to store in at least one DSN memory. As a still further example, the guidance may indicate to store part of the data portion in local memory and the other part of the data portion as data slices in at least one DSN memory.

The DS processing unit stores the data portion in accordance with the guidance. Such creating of data slices includes dispersed storage error encoding portion data (e.g., at least a part of a data portion). The dispersed storage error encoding may utilize different error coding dispersal storage function parameters from DS processing unit two DS processing unit such that data slices stored in at least one DSN memory are created differently from DS processing unit to DS processing unit for different data portions of the data.

The method continues at step 468 where the processing module facilitates storage of the portion affiliation information in a DS managing unit. For example, the processing module sends the portion affiliation information to the DS managing unit for storage therein. As another example, the processing module sends a confirmation message to the DS managing unit that the portion affiliation information received in response to a DS managing unit query was utilized in the storage sequence. As such, the processing module confirms that the DS units and data portions chosen by the DS managing unit were utilized in the storage sequence.

FIG. 24B is a flowchart illustrating an example of retrieving data. The method begins with step 470 where a processing module (e.g., a user device) retrieves portion affiliation information from a dispersed storage (DS) managing unit. The receiving includes the module sending a portion affiliation information request message to the DS managing unit to retrieve the portion affiliation information. The processing module receives the portion affiliation information from the DS managing unit.

The method continues at step 472 where the processing module determines the DS processing units affiliated with the data portions based on the portion affiliation information. The method continues at step 474 where the processing module sends the DS processing units data portion retrieval requests in accordance with the portion affiliation information. The data portion retrieval request includes a portion ID and a retrieval request code. The DS processing unit may retrieve a data portion by at least one of directly from local memory, from local memory and from at least one dispersed storage network (DSN) memory, and from at least one DSN memory. The DS processing units may utilize a different error coding dispersal storage function parameters in reconstructing the data portions from retrieved data slices. The method continues at step 476 where the processing module receives data portions from the DS processing units. The method continues at step 478 where the processing module aggregates the data portions to produce the data in accordance with the portion affiliation information.

Figure 25:
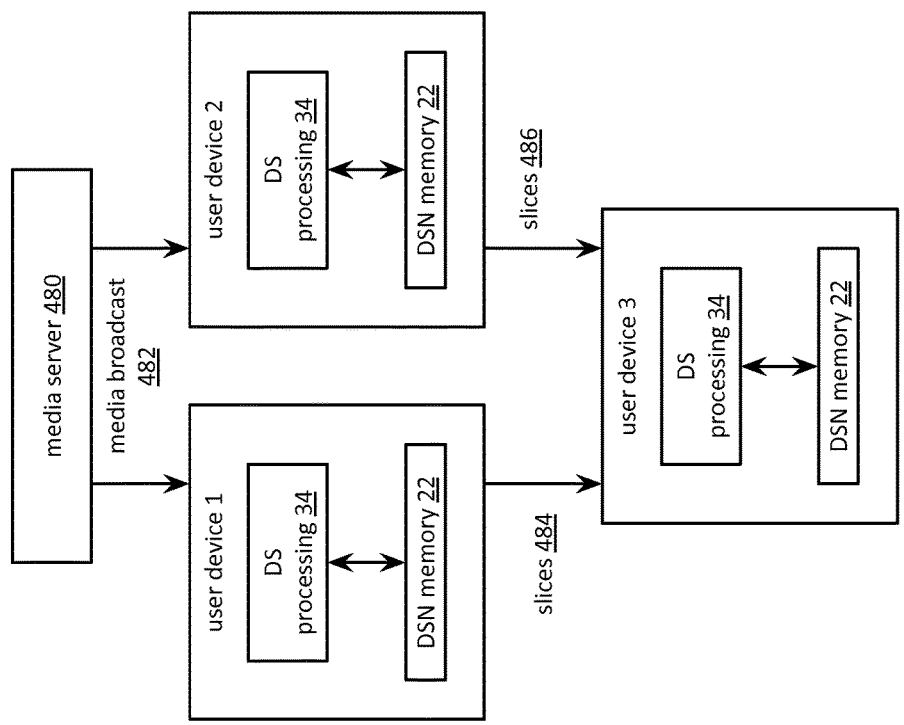
FIG. 25 is a schematic block diagram of an embodiment of a media redistribution system in accordance with invention.

FIG. 25 is a schematic block diagram of an embodiment of a media redistribution system. The system includes a media server 480 and a plurality of user devices 1-3. The user devices 1-3 include one or more of a dispersed storage (DS) processing 34, a dispersed storage network (DSN) memory 22, a DS unit 36, a user interface (e.g., a display screen and speaker to view and listen to a media broadcast), at least one wireless device, and at least one wireline interface. Such user devices 1-3 may be affiliated as neighboring devices to each other (e.g., affiliated to same group, affiliated by distance). The media server 480 provides a media broadcast 482 to the plurality of user devices 1-3. The media broadcast 482 may include one or more of audio streaming, video streaming, multimedia streaming, music streaming, video files, audio files, and multimedia files. The media broadcast 482 may be communicated in one or more of a format native to an industry standard (e.g., MPEG2 or video, MP4 for music, etc.), as a dispersed error encoded file, and as a plurality of sets of encoded data slices.

The media server 480 may be operably coupled to the plurality of user devices 1-3 by way of a wireline and/or a wireless network. The plurality of user devices 1-3 may be operably coupled to each other by way of the wireline and/or the wireless network. As such, any user device of the plurality of user devices 103 may not be able to communicate directly with the media server 480 when wireless signaling conditions prohibit a connection to facilitate communications when the wireless network is utilized for connectivity. A pair of user devices of the plurality of user devices 1-3 may be able to communicate with each other utilizing a first wireless network and at least one user device of the pair of user devices may be able to communicate to a third user device utilizing a second wireless network. For example, user devices 1 and 2 are able to communicate directly to the media server 480 and user device 3 is able to communicate to user devices 1 and 2, but not directly to the media server 480.

In a first mode of operation, a first user device receives the media broadcast 482 directly from the media server 480, obtains data slices from the media broadcast 482, and stores the data slices in a local DSN memory associated with the first user device. The obtaining includes at least one of dispersed storage error encoding the media broadcast 482 to produce the data slices and extracting the data slices from the media broadcast 482. The first user device may subsequently retrieve the data slices of the media broadcast from the local DSN memory for further processing (e.g., listening and watching via a user interface associated with the first user device). The first user device may send at least some of the data slices 484 of the media broadcast to a second user device when the second user device has a desire for the media broadcast.

In a second mode of operation, a second user device receives at least some data slices 484 of the media broadcast from the first user device and saves the at least some data slices in a local DSN memory associated with the second user device. The second user device may receive the same or different data slices 486 of the same media broadcast from another user device other than the first user device. The second user device receives at least a decode threshold number of slices corresponding to each data segment of a plurality of data segments of the media broadcast from one or more other user devices to enable dispersed storage error decoding of each data segment of the media broadcast. The second user device may retrieve the data slices of the media broadcast from the local DSN memory associated with the second user device for further processing (e.g., listening and watching via a user interface associated with the second user device). The second user device may send at least some of the data slices of the media broadcast to a third user device.

In an example of operation, the media server 480 sends the media broadcast 482 to user device 1 and as a duplicate media broadcast to user device 2. The sending includes at least one of transmitting the media broadcast 482 in a video stream format and transmitting the media broadcast 482 in a data slice format. User device 1 receives the media broadcast 482 from the media server 480. User device 1 creates sequential data segments of the media broadcast and produces data slices of each data segment in accordance with an error coding dispersal storage function when the media broadcast is received in a video stream format. User device 1 stores the data slices in a local DSN memory associated with user device 1. For example, user device 1 stores the data slices in one or more of the main memory 54, flash memory via the flash interface module 72, a hard drive via the hard drive interface module 74, and local DSN memory via DSN interface module 76. Alternatively, user device 1 sends at least some of the data slices 484 to one or more other user devices for storage therein. User device 1 subsequently retrieves the data slices from the local DSN memory, dispersed storage error decodes the data slices to reproduce the media broadcast 482, and outputs the media broadcast 482 to a user interface associated with user device 1.

In another example of operation, user device 2 receives the media broadcast 482 from the media server 480, obtains and stores data slices of the media broadcast 482, and subsequently retrieves the data slices to re-create the media broadcast and provide the media broadcast 482 to a user interface associated with user device 2. User device 2 may utilize substantially a same error coding dispersal storage function parameters when creating the data slices of the media broadcast 482 such that another user device receiving forwarded data slices 484 & 486 from user devices 1 and 2 may more effectively re-create the media broadcast. For instance, user devices 1 and 2 forward data slices of every pillar to another user device as slices 484 and slices 486. As another instance, user devices 1 and 2 coordinate the sending of data slices of the pillars such that data slices of overlapping pillars is at least partially minimized. As such, not all of the pillars are forwarded from both of user devices 1 and 2. User devices 1 and 2 may coordinate the sending of the pillars by communicating coordination information between each other or by receiving coordination information from the media server 480.

In yet another example of operation, user device 3 determines that communications directly with the media server 480 is not possible. User device 3 determines that communications with user devices 1 and 2 is possible. User device 3 determines that user device 1 and 2 are receiving a desired media broadcast 482 from the media server 480. User device 3 sends a media broadcast slice request to user devices 1 and 2. User devices 1 and 2 send at least some data slices 484 & 486 of the media broadcast 482 to user device 3. User device 3 receives at least some data slices 484 from user device 1 and at least some data slices 486 from user device 2. For instance, user device 3 receives data slices 484 of pillars 1 through k from user device 1 (e.g., a decode threshold number for each data segment) and receives data slices 486 of pillars k+1 through n from user device 2. The method of operation is discussed in greater detail with reference to FIG. 26.

Figure 26:
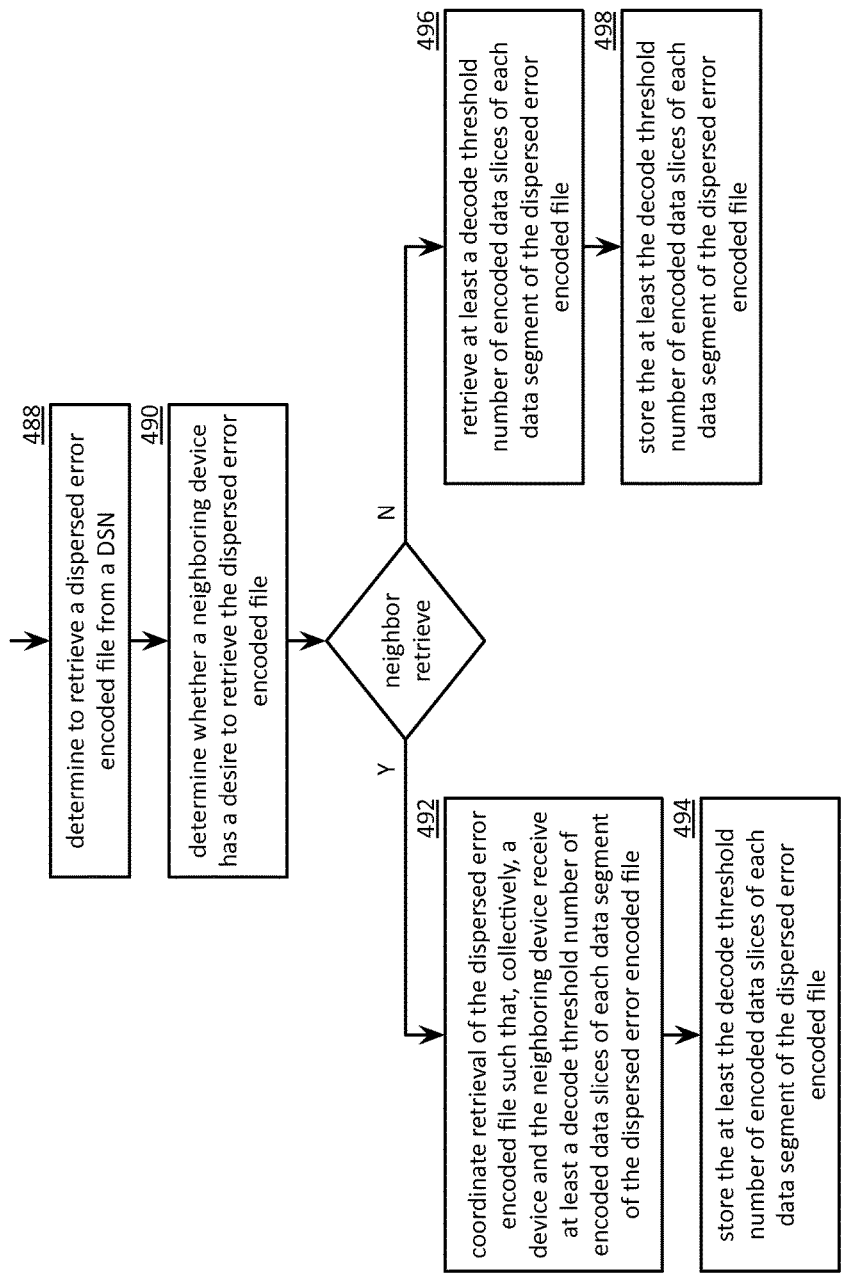
FIG. 26 is a flowchart illustrating an example of redistributing media in accordance with the invention.

FIG. 26 is a flowchart illustrating an example of redistributing media in accordance with the invention. The method begins with step 488 where a processing module (e.g., of a user device) determines to retrieve a dispersed error encoded file from a dispersed storage network (DSN), wherein the dispersed error encoded file is stored as a plurality of sets of encoded data slices and wherein a data segment of the file is encoded into a set of encoded data slices of the plurality of sets of encoded data slices. The DSN may be affiliated with one or more of a media server, a plurality of user devices affiliated with a present user device, a standalone DSN, and a memory of another user device. The determination to retrieve the dispersed error encoded file includes one or more of receiving a request, interpreting a command, receiving a user input, and determining a user preference.

The method continues at step 490 where the processing module determines whether a neighboring device has a desire to retrieve the dispersed error encoded file. The determining includes one or more of querying the neighboring device, receiving a dispersed error encoded file retrieval request from the neighboring device, accessing a neighboring device preference indicator (e.g., media content that is likely to be desired), accessing a look up table, and determining that the neighboring device is affiliated with a user group of the device. The method branches to step 496 when the processing module determines that the neighboring device does not have the desire to retrieve the dispersed error encoded file. The method continues to step 492 when the processing module determines that the neighboring device has the desire to retrieve the dispersed error encoded file.

The method continues at step 492 where the processing module coordinates retrieving of the dispersed error encoded file such that, collectively, the device and the neighboring device receive at least a decode threshold number of encoded data slices of each data segment of a plurality of data segments of the dispersed error encoded file. Such receiving includes receiving at least a decode threshold number of encoded data slices of a first set of encoded data slices and at least the decode threshold number of encoded data slices of a second set of encoded data slices.

The coordinating includes at least one of the device retrieving a first portion of each of the at least the decode threshold number of encoded data slices of the first and second sets of encoded data slices and the neighboring device retrieving a second portion of each of the at least the decode threshold number of encoded data slices of the first and second sets of encoded data slices; the device retrieving the at least the decode threshold number of encoded data slices of the first set of encoded data slices and the neighboring device retrieving the at least the decode threshold number of encoded data slices of the second set of encoded data slices; and the device retrieving the at least the decode threshold number of encoded data slices of the first set and second set of encoded data slices and the device forwarding the at least the decode threshold number of encoded data slices of the first set and second set of encoded data slices to the neighboring device.

The method continues at step 494 where the processing module stores the at least the decode threshold number of encoded data slices of each data segment of the plurality of data segments of the dispersed error encoded file. The storing includes storing the at least the decode threshold number of encoded data slices of the first set and second set of encoded data slices. The storing includes at least one of storing the at least the decode threshold number of encoded data slices of the first set and second set of encoded data slices as received and transcoding the at least the decode threshold number of encoded data slices of the first set and second set of encoded data slices from a first set of dispersed storage error coding parameters to a second set of dispersed storage error coding parameters to produce transcoded sets of encoded data slices and storing the transcoded sets of encoded data slices.

The method continues at step 496 where the processing module retrieves at least the decode threshold number of encoded data slices of each data segment of the plurality of data segments of the dispersed error encoded file when the processing module determines that the neighboring device does not have the desire to retrieve the dispersed error encoded file. Such retrieving includes receiving at least a decode threshold number of encoded data slices of the first set of encoded data slices and at least the decode threshold number of encoded data slices of the second set of encoded data slices.

The method continues at step 498 where the processing module stores the at least the decode threshold number of encoded data slices of each data segment of the plurality of data segments of the dispersed error encoded file. The storing includes storing the at least the decode threshold number of encoded data slices of the first set and second set of encoded data slices. The storing includes at least one of storing the at least the decode threshold number of encoded data slices of the first set and second set of encoded data slices as received and transcoding the at least the decode threshold number of encoded data slices of the first set and second set of encoded data slices from the first set of dispersed storage error coding parameters to the second set of dispersed storage error coding parameters to produce transcoded sets of encoded data slices and storing the transcoded sets of encoded data slices.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method comprises:
   dispersed storage error encoding a data segment to produce a set of encoded data slices;
   dispersed storage error encoding metadata associated with the data segment to produce a set of encoded metadata slices, wherein the metadata includes at least one of an object identifier (ID), object size, object type, object format, directory information, a file name, a file path, a source name, a dispersed storage network (DSN) address, a snapshot identifier, a segmentation allocation table (SAT) source name, object hash, access permissions, or a timestamp;
   creating a set of data slice names for the set of encoded data slices;
   creating a set of metadata slice names based on the set of data slice names;
   sending the set of encoded data slices and the set of data slice names to a dispersed storage network (DSN) memory, wherein the DSN memory stores an encoded data slice of the set of encoded data slices based on a corresponding one of the set of data slice names using a first level of memory allocation; and
   sending the set of encoded metadata slices and the set of metadata slice names to the DSN memory, wherein the DSN memory stores an encoded metadata slice of the set of encoded metadata slices based on a corresponding one of the set of metadata slice names using a second level of memory allocation, and wherein the second level of memory allocation is smaller than the first level of memory allocation.

2. The method of claim 1 further comprises:
   sending the encoded data slice and the corresponding one of the set of data slice names to a first dispersed storage (DS) unit of the DSN memory, wherein memory space of the first DS unit is partitioned in accordance with the first level of memory allocation; and
   sending the encoded metadata slice and the corresponding one of the set of metadata slice names to a second DS unit of the DSN memory, wherein memory space of the second DS unit is partitioned in accordance with the second level of memory allocation.

3. The method of claim 1 further comprises:
   sending the encoded data slice and the corresponding one of the set of data slice names to a dispersed storage (DS) unit of the DSN memory, wherein a first portion of memory space of the DS unit is partitioned in accordance with the first level of memory allocation; and
   sending the encoded metadata slice and the corresponding one of the set of metadata slice names to the DS unit, wherein a second portion of the memory space of the DS unit is partitioned in accordance with the second level of memory allocation.

4. The method of claim 1, wherein the creating the set of data slice names is based on at least one of:
   a data identifier (ID) associated with the data segment;
   a vault ID lookup;
   a directory lookup;
   a source name;
   a vault source name;
   the set of encoded data slices;
   a hash of the data segment; or
   an object number associated with the data ID.

5. The method of claim 1, wherein the creating the set of metadata slice names comprises at least one of:
   toggling a data/metadata flag of a data slice name of the set of data slice names to produce a corresponding metadata slice name of the set of metadata slice names;
   performing an exclusive OR (XOR) logical function on the data slice name with a naming mask to produce the corresponding metadata slice name;
   adding a constant value to the data slice name to produce the corresponding metadata slice name; or
   subtracting the constant value from the data slice name to produce the corresponding metadata slice name.

6. A method comprises:
   determining a set of data slice names corresponding to a data segment previously stored in a dispersed storage network (DSN) memory as a set of encoded data slices;
   determining a set of metadata slice names based on the set of data slice names, wherein the metadata slice names correspond to metadata previously stored in the DSN memory as a set of encoded metadata slices, wherein the metadata includes at least one of an object identifier (ID), object size, object type, object format, directory information, a file name, a file path, a source name, a dispersed storage network (DSN) address, a snapshot identifier, a segmentation allocation table (SAT) source name, object hash, access permissions, or a timestamp;
   retrieving at least a decode threshold number of encoded data slices of the set of encoded data slices from the DSN memory to produce received encoded data slices utilizing the set of data slice names, wherein the DSN memory retrieves an encoded data slice of the set of encoded data slices based on a corresponding one of the set of data slice names using a first level of memory allocation;
   retrieving at least a decode threshold number of encoded metadata slices of the set of encoded metadata slices from the DSN memory to produce received encoded metadata slices utilizing the set of metadata slice names, wherein the DSN memory retrieves an encoded metadata slice of the set of encoded metadata slices based on a corresponding one of the set of metadata slice names using a second level of memory allocation, and wherein the second level of memory allocation is smaller than the first level of memory allocation;
   dispersed storage error decoding the received encoded data slices to reproduce the data segment; and
   dispersed storage error decoding the received encoded metadata slices to reproduce the metadata.

7. The method of claim 6 further comprises:
transforming the data segment utilizing a metadata function to produce transformed data in accordance with the metadata; and
sending the transformed data to a requesting entity.

8. The method of claim 6, wherein the dispersed storage error decoding the received encoded data slices comprises:
dispersed storage error decoding the received encoded data slices based on the metadata to reproduce the data segment.

9. A computer comprises:
an interface;
a non-transitory memory that stores operational instructions; and
at least one processing device that executes the operational instructions, which cause the at least one processing device to:
dispersed storage error encode a data segment to produce a set of encoded data slices;
dispersed storage error encode metadata associated with the data segment to produce a set of encoded metadata slices, wherein the metadata includes at least one of an object identifier (ID), object size, object type, object format, directory information, a file name, a file path, a source name, a dispersed storage network (DSN) address, a snapshot identifier, a segmentation allocation table (SAT) source name, object hash, access permissions, or a timestamp;
create a set of data slice names for the set of encoded data slices;
create a set of metadata slice names based on the set of data slice names;
send, via the interface, the set of encoded data slices and the set of data slice names to a dispersed storage network (DSN) memory, wherein the DSN memory stores an encoded data slice of the set of encoded data slices based on a corresponding one of the set of data slice names using a first level of memory allocation; and
send, via the interface, the set of encoded metadata slices and the set of metadata slice names to the DSN memory, wherein the DSN memory stores an encoded metadata slice of the set of encoded metadata slices based on a corresponding one of the set of metadata slice names using a second level of memory allocation, and wherein the second level of memory allocation is smaller than the first level of memory allocation.

10. The computer of claim 9, wherein executing the operational instructions further cause the at least one processing device to:
send, via the interface, the encoded data slice and the corresponding one of the set of data slice names to a first dispersed storage (DS) unit of the DSN memory, wherein memory space of the first DS unit is partitioned in accordance with the first level of memory allocation; and
send, via the interface, the encoded metadata slice and the corresponding one of the set of metadata slice names to a second DS unit of the DSN memory, wherein memory space of the second DS unit is partitioned in accordance with the second level of memory allocation.

11. The computer of claim 9, wherein executing the operational instructions further cause the at least one processing device to:
send, via the interface, the encoded data slice and the corresponding one of the set of data slice names to a dispersed storage (DS) unit of the DSN memory, wherein a first portion of memory space of the DS unit is partitioned in accordance with the first level of memory allocation; and
send, via the interface, the encoded metadata slice and the corresponding one of the set of metadata slice names to the DS unit, wherein a second portion of the memory space of the DS unit is partitioned in accordance with the second level of memory allocation.

12. The computer of claim 9, wherein the at least one processing device functions to create the set of data slice names based on at least one of:
a data identifier (ID) associated with the data segment;
a vault ID lookup;
a directory lookup;
a source name;
a vault source name;
the set of encoded data slices;
a hash of the data segment; or
an object number associated with the data ID.

13. The computer of claim 9, wherein the at least one processing device functions to create the set of metadata slice names by at least one of:
toggling a data/metadata flag of a data slice name of the set of data slice names to produce a corresponding metadata slice name of the set of metadata slice names;
performing an exclusive OR (XOR) logical function on the data slice name with a naming mask to produce the corresponding metadata slice name;
adding a constant value to the data slice name to produce the corresponding metadata slice name; or
subtracting the constant value from the data slice name to produce the corresponding metadata slice name.

14. A computer comprises:
an interface;
a non-transitory memory that stores operational instructions; and
a at least one processing device that executes the operational instructions, which cause the at least one processing device to:
determine a set of data slice names corresponding to a data segment previously stored in a dispersed storage network (DSN) memory as a set of encoded data slices;
determine a set of metadata slice names based on the set of data slice names, wherein the metadata slice names correspond to metadata previously stored in the DSN memory as a set of encoded metadata slices, wherein the metadata includes at least one of an object identifier (ID), object size, object type, object format, directory information, a file name, a file path, a source name, a dispersed storage network (DSN) address, a snapshot identifier, a segmentation allocation table (SAT) source name, object hash, access permissions, or a timestamp;
retrieve, via the interface, at least a decode threshold number of encoded data slices of the set of encoded data slices from the DSN memory to produce received encoded data slices utilizing the set of data slice names, wherein the DSN memory retrieves an encoded data slice of the set of encoded data slices based on a corresponding one of the set of data slice names using a first level of memory allocation;
retrieve, via the interface, at least a decode threshold number of encoded metadata slices of the set of encoded metadata slices from the DSN memory to produce received encoded metadata slices utilizing the set of metadata slice names, wherein the DSN memory retrieves an encoded metadata slice of the set of encoded metadata slices based on a corresponding one of the set of metadata slice names using a second level of memory allocation, and wherein the second level of memory allocation is smaller than the first level of memory allocation;

dispersed storage error decode the received encoded data slices to reproduce the data segment; and dispersed storage error decode the received encoded metadata slices to reproduce the metadata.

15. The computer of claim 14, wherein executing the operational instructions further cause the at least one processing device to:

transform the data segment utilizing a metadata function to produce transformed data in accordance with the metadata; and send, via the interface, the transformed data to a requesting entity.

16. The computer of claim 14, wherein executing the operational instructions further cause the at least one processing device to dispersed storage error decode the received encoded data slices by:

dispersed storage error decoding the received encoded data slices based on the metadata to reproduce the data segment.

* * * * *